United States Patent
Chiang et al.

(10) Patent No.: US 9,825,280 B2
(45) Date of Patent: Nov. 21, 2017

(54) SEMI-SOLID ELECTRODE CELL HAVING A POROUS CURRENT COLLECTOR AND METHODS OF MANUFACTURE

(75) Inventors: Yet-Ming Chiang, Framingham, MA (US); William Craig Carter, Jamaica Plain, MA (US); James C. Cross, III, Carlisle, MA (US); Ricardo Bazzarella, Woburn, MA (US); Naoki Ota, Fishers, IN (US)

(73) Assignee: 24M Technologies, Inc., Cambridge, MA (US)

(*) Notice: Subject to any disclaimer, the term of this patent is extended or adjusted under 35 U.S.C. 154(b) by 1031 days.

(21) Appl. No.: 13/606,986

(22) Filed: Sep. 7, 2012

(65) Prior Publication Data
US 2013/0065122 A1    Mar. 14, 2013

Related U.S. Application Data

(60) Provisional application No. 61/531,927, filed on Sep. 7, 2011.

(51) Int. Cl.
| | |
|---|---|
| H01M 4/64 | (2006.01) |
| H01M 4/04 | (2006.01) |
| H01M 4/76 | (2006.01) |
| H01M 10/052 | (2010.01) |
| H01M 4/02 | (2006.01) |

(52) U.S. Cl.
CPC ....... *H01M 4/0433* (2013.01); *H01M 4/0478* (2013.01); *H01M 4/76* (2013.01); *H01M 10/052* (2013.01); *H01M 2004/023* (2013.01); *Y10T 29/4911* (2015.01); *Y10T 29/49108* (2015.01)

(58) Field of Classification Search
None
See application file for complete search history.

(56) References Cited

U.S. PATENT DOCUMENTS

| | | |
|---|---|---|
| 2,208,028 A | 7/1940 | Harrington |
| 3,624,628 A | 11/1971 | Schmidt |
| (Continued) | | |

FOREIGN PATENT DOCUMENTS

| | | |
|---|---|---|
| CN | 1354529 | 6/2002 |
| CN | 101212070 | 7/2008 |
| (Continued) | | |

OTHER PUBLICATIONS

Duduta et al., Semi-Solid Lithium Rechargeable Flow Battery, May 20, 2011 (May 20, 2011) [retrieved on Jan. 20, 2013 (Jan. 20, 2013)]Retrieved from the Internet:<URL: http://69.12.216.159/files/2011001522_ftp.pdf (6 pages).

(Continued)

*Primary Examiner* — Ula C Ruddock
*Assistant Examiner* — Matthew Van Oudenaren
(74) *Attorney, Agent, or Firm* — Cooley LLP

(57) ABSTRACT

An electrochemical cell includes an anode, a semi-solid cathode, and a separator disposed therebetween. The semi-solid cathode includes a porous current collector and a suspension of an active material and a conductive material disposed in a non-aqueous liquid electrolyte. The porous current collector is at least partially disposed within the suspension such that the suspension substantially encapsulates the porous current collector.

23 Claims, 9 Drawing Sheets

(56) References Cited

U.S. PATENT DOCUMENTS

| | | | |
|---|---|---|---|
| 4,105,815 A | 8/1978 | Buckler | |
| 4,199,912 A | 4/1980 | James, Jr. et al. | |
| 4,386,019 A | 5/1983 | Kann et al. | |
| 4,695,355 A | 9/1987 | Koziol | |
| 4,818,643 A | 4/1989 | Cook et al. | |
| 4,925,752 A | 5/1990 | Fauteux et al. | |
| 5,316,556 A | 5/1994 | Morris | |
| 5,674,556 A | 10/1997 | Fukumura et al. | |
| 5,697,145 A | 12/1997 | Fukumura et al. | |
| 5,725,822 A | 3/1998 | Kelletr et al. | |
| 5,749,927 A | 5/1998 | Chern et al. | |
| 5,792,576 A | 8/1998 | Xing et al. | |
| 5,834,052 A | 11/1998 | Fukumura et al. | |
| 5,837,397 A * | 11/1998 | Xing | H01M 4/13 429/162 |
| 6,207,322 B1 | 3/2001 | Kelsey et al. | |
| 6,264,707 B1 | 7/2001 | Ishikawa et al. | |
| 6,284,192 B1 | 9/2001 | Coonan et al. | |
| 6,287,722 B1 | 9/2001 | Barton et al. | |
| 6,291,091 B1 | 9/2001 | Preischl et al. | |
| 6,403,262 B1 | 6/2002 | Xing et al. | |
| 6,503,432 B1 | 1/2003 | Barton et al. | |
| 6,589,299 B2 | 7/2003 | Missling et al. | |
| 6,939,383 B2 | 9/2005 | Eastin et al. | |
| 6,986,967 B2 | 1/2006 | Barton et al. | |
| 7,338,734 B2 | 3/2008 | Chiang et al. | |
| 7,700,019 B2 | 4/2010 | Lavoie et al. | |
| 8,722,226 B2 | 5/2014 | Chiang et al. | |
| 8,722,227 B2 | 5/2014 | Chiang et al. | |
| 8,778,552 B2 | 7/2014 | Chiang et al. | |
| 8,993,159 B2 | 3/2015 | Chiang et al. | |
| 9,153,833 B2 | 10/2015 | Chiang et al. | |
| 9,178,200 B2 | 11/2015 | Bazzarella et al. | |
| 9,184,464 B2 | 11/2015 | Chiang et al. | |
| 9,203,092 B2 | 12/2015 | Slocum et al. | |
| 9,293,781 B2 | 3/2016 | Chiang et al. | |
| 9,362,583 B2 | 6/2016 | Chiang et al. | |
| 9,385,392 B2 | 7/2016 | Chiang et al. | |
| 9,401,501 B2 | 7/2016 | Bazzarella et al. | |
| 9,437,864 B2 | 9/2016 | Tan et al. | |
| 9,484,569 B2 | 11/2016 | Doherty et al. | |
| 2001/0021471 A1* | 9/2001 | Xing | H01M 2/08 429/162 |
| 2002/0106561 A1* | 8/2002 | Lee | H01M 4/602 429/218.1 |
| 2004/0029008 A1 | 2/2004 | Winterberg et al. | |
| 2005/0064270 A1 | 3/2005 | Marianowski | |
| 2008/0096110 A1 | 4/2008 | Bito et al. | |
| 2008/0289676 A1 | 11/2008 | Guidotti et al. | |
| 2009/0023041 A1 | 1/2009 | Cooper | |
| 2010/0047671 A1 | 2/2010 | Chiang et al. | |
| 2010/0112454 A1 | 5/2010 | Visco et al. | |
| 2010/0196800 A1 | 8/2010 | Markoski et al. | |
| 2010/0323264 A1 | 12/2010 | Chiang et al. | |
| 2011/0086258 A1 | 4/2011 | Yaginuma et al. | |
| 2011/0189520 A1 | 8/2011 | Carter et al. | |
| 2011/0200848 A1 | 8/2011 | Chiang et al. | |
| 2011/0274948 A1 | 11/2011 | Duduta et al. | |
| 2012/0164499 A1 | 6/2012 | Chiang et al. | |
| 2013/0055559 A1 | 3/2013 | Slocum et al. | |
| 2013/0309547 A1 | 11/2013 | Bazzarella et al. | |
| 2013/0337319 A1 | 12/2013 | Doherty et al. | |
| 2014/0004437 A1 | 1/2014 | Slocum et al. | |
| 2014/0030623 A1 | 1/2014 | Chiang et al. | |
| 2014/0039710 A1 | 2/2014 | Carter et al. | |
| 2014/0154546 A1 | 6/2014 | Carter et al. | |
| 2014/0170524 A1 | 6/2014 | Chiang et al. | |
| 2014/0248521 A1 | 9/2014 | Chiang et al. | |
| 2014/0315097 A1 | 10/2014 | Tan et al. | |
| 2015/0024279 A1 | 1/2015 | Tan et al. | |
| 2015/0129081 A1 | 5/2015 | Chiang et al. | |
| 2015/0140371 A1 | 5/2015 | Slocum et al. | |
| 2015/0171406 A1 | 6/2015 | Bazzarella et al. | |
| 2015/0280267 A1 | 10/2015 | Chiang et al. | |
| 2015/0295272 A1 | 10/2015 | Chiang et al. | |
| 2015/0357626 A1 | 12/2015 | Holman et al. | |
| 2016/0013507 A1 | 1/2016 | Chiang et al. | |
| 2016/0056490 A1 | 2/2016 | Chiang et al. | |
| 2016/0056491 A1 | 2/2016 | Chiang et al. | |
| 2016/0105042 A1 | 4/2016 | Taylor et al. | |
| 2016/0126543 A1 | 5/2016 | Ota et al. | |
| 2016/0133916 A1 | 5/2016 | Zagars et al. | |
| 2016/0190544 A1 | 6/2016 | Slocum et al. | |
| 2016/0218375 A1 | 7/2016 | Chiang et al. | |
| 2016/0268621 A1 | 9/2016 | Chiang et al. | |
| 2016/0308218 A1 | 10/2016 | Ota et al. | |
| 2016/0344006 A1 | 11/2016 | Ota et al. | |
| 2016/0372802 A1 | 12/2016 | Chiang et al. | |
| 2017/0018798 A1 | 1/2017 | Tan et al. | |
| 2017/0025646 A1 | 1/2017 | Ota et al. | |
| 2017/0025674 A1 | 1/2017 | Tan et al. | |
| 2017/0033389 A1 | 2/2017 | Chiang et al. | |
| 2017/0033390 A1 | 2/2017 | Chiang et al. | |

FOREIGN PATENT DOCUMENTS

| | | |
|---|---|---|
| JP | H11-111265 | 4/1999 |
| JP | 2007-335283 | 12/2007 |
| JP | 2010-062008 | 3/2010 |
| JP | 2011-077269 | 4/2011 |
| WO | WO 2010/118060 | 10/2010 |
| WO | WO2010/137415 | 12/2010 |
| WO | WO2012/024499 | 2/2012 |
| WO | WO2012/088442 | 6/2012 |

OTHER PUBLICATIONS

International Search Report and Written Opinion mailed Feb. 21, 2013, issued for International Patent Application No. PCT/US2012/054219 (13 pages).

International Search Report and Written Opinion for International Application No. PCT/US2012/054219, dated Feb. 21, 2013, 13 pages.

International Search Report and Written Opinion for International Application No. PCT/US2012/054218, dated Feb. 15, 2013, 10 pages.

Duduta, M. et al., "Semi-Solid Lithium Rechargeable Flow Battery," Advanced Energy Materials (May 20, 2011) [retrieved on Jan. 20, 2013]. Retrieved from the Internet: <URL: http://69.12.216.159/files/201100152.ftp.pdf. 6 pages.

Supplementary European Search Report, dated Feb. 25, 2015 for Application No. EP12830248, filed Sep. 7, 2012.

Office Action for U.S. Appl. No. 13/607,021, dated Apr. 20, 2015, 8 pages.

Office Action for U.S. Appl. No. 13/607,021, dated Jul. 10, 2015, 4 pages.

Office Action for Chinese Application No. 201280051582.5, dated Nov. 4, 2015, 19 pages.

Notification of the Second Office Action for Chinese Application No. 201280051582.5, dated Aug. 26, 2016, 7 pages.

Office Action for European Application No. 12830248.6, dated Jan. 19, 2017, 5 pages.

Notice of Reasons for Rejection for Japanese Patent Application No. 2014-529905, dated Jun. 29, 2016, 9 pages.

Armand, M. et al., "Conjugated dicarboxylate anodes for Li-ion batteries," Nature Materials, 8:120-125 (2009).

Bervas, M. et al., "Investigation of the Lithiation and Delithiation Conversion Mechanisms in a Bismuth Fluoride Nanocomposites," Journal of the Electrochemical Society, 153(4):A799-A808 (2006).

Chan, C. K. et al., "High-performance lithium battery anodes using silicon nanowires," Nature Nanotechnology, 3:31-35 (2008).

Li, H. et al., "Li-Storage via Heterogeneous Reaction in Selected Binary Metal Fluorides and Oxides," Journal of Electrochemical Society, 151(11):A1878-A1885 (2004).

Nakahara, K. et al. "Rechargeable batteries with organic radical cathodes," Chemical Physics Letters, 359:351-354 (2002).

Nishide, H. et al., "Organic radical battery: nitroxide polymers as a cathode-active material," Electrochimica Acta, 50:827-831 (2004).

(56) References Cited

OTHER PUBLICATIONS

Plitz, I. et al., "Structure and Electrochemistry of Carbon-Metal Fluoride Nanocomposites Fabricated by a Solid State Redox Conversion Reaction", Journal of The Electrochemical Society, 152(2):A307-A315 (2005).

* cited by examiner

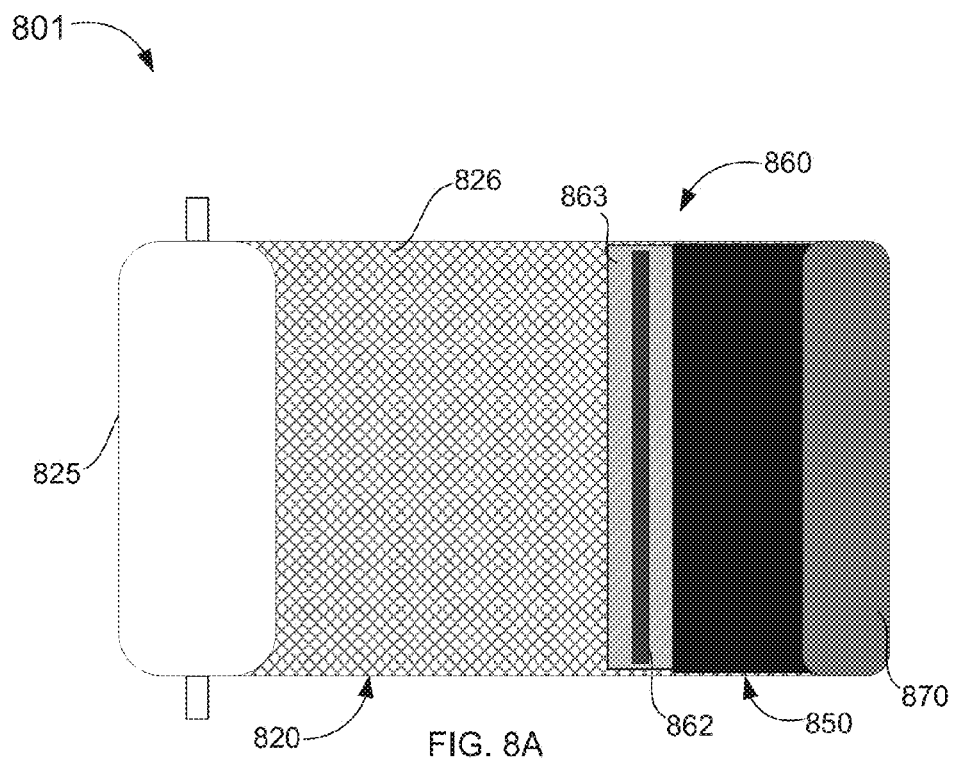
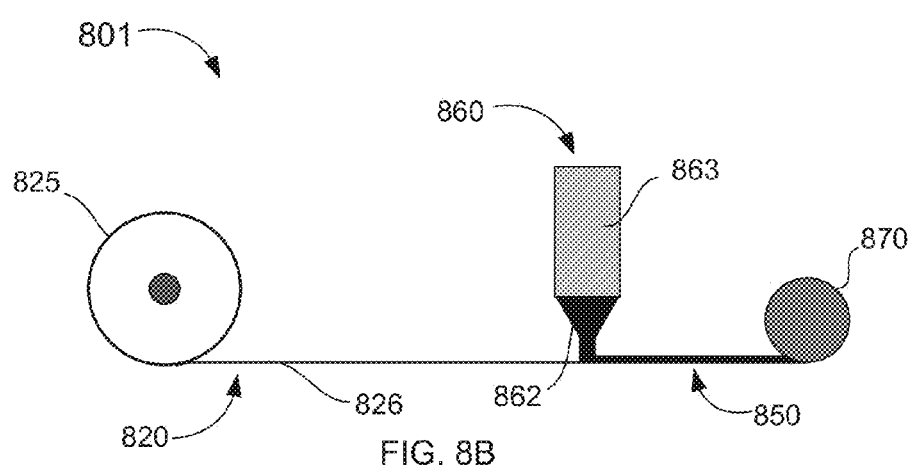

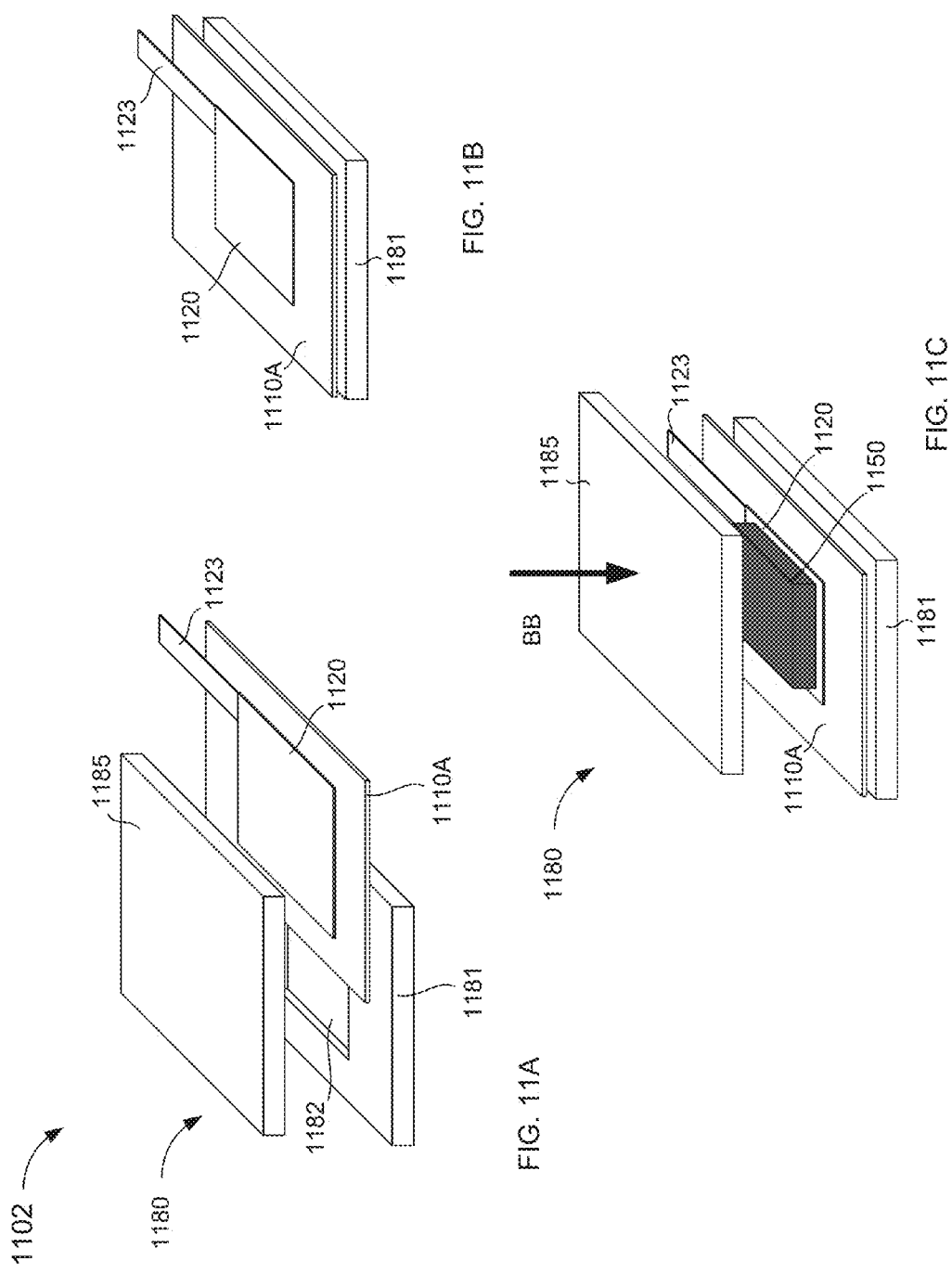

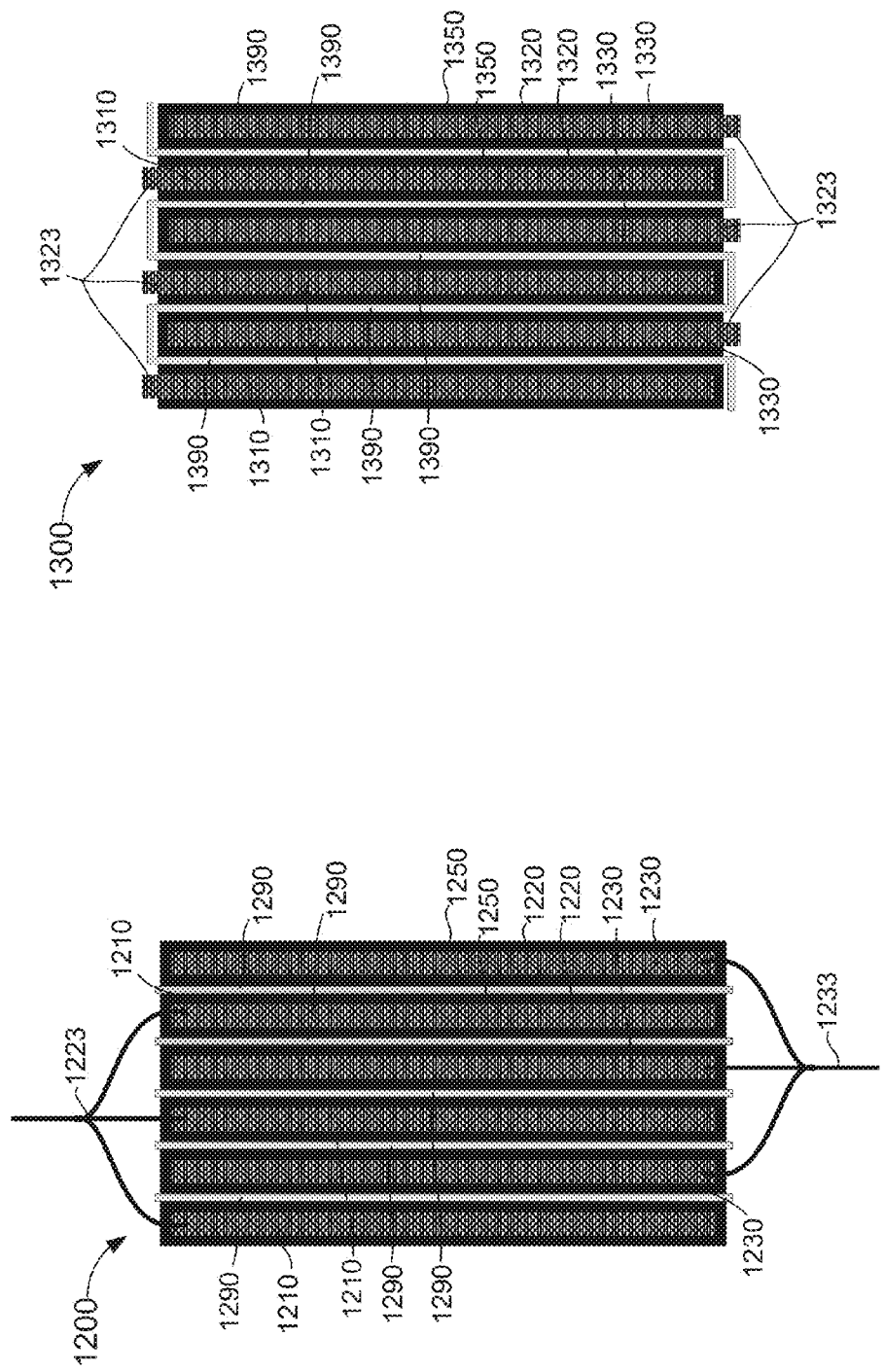

US 9,825,280 B2

SEMI-SOLID ELECTRODE CELL HAVING A POROUS CURRENT COLLECTOR AND METHODS OF MANUFACTURE

CROSS REFERENCE TO RELATED APPLICATIONS

This application claims priority to and the benefit of U.S. Provisional Application Ser. No. 61/531,927, filed Sep. 7, 2011, entitled, "Battery Manufacturing Method," which is incorporated by reference herein in its entirety.

STATEMENT REGARDING FEDERALLY SPONSORED RESEARCH OR DEVELOPMENT

This invention was made with government support under Grant Number DE-AR0000102 awarded by the Department of Energy. The government has certain rights in this invention.

BACKGROUND

Embodiments described herein relate generally to the preparation of electrode cells for use in electrochemical devices and more particularly to systems and methods of using a semi-solid electrode cell having a porous current collector in a battery module.

Conventional battery systems store electrochemical energy by separating an ion source and ion sink at differing ion electrochemical potential. A difference in electrochemical potential produces a voltage difference between the positive and negative electrodes, which produces an electric current if the electrodes are connected by a conductive element. In a convention battery system, negative electrodes and positive electrodes are connected via a parallel configuration of two conductive elements. The external elements exclusively conduct electrons, however, the internal elements, being separated by a separator and electrolyte, exclusively conduct ions. The external and internal flow streams supply ions and electrons at the same rate, as a charge imbalance cannot be sustained between the negative electrode and positive electrode. The produced electric current can be used to drive an external device. A rechargeable battery can be recharged by application of an opposing voltage difference that drives electric and ionic current in an opposite direction as that of a discharging battery. Accordingly, active material of a rechargeable battery requires the ability to accept and provide ions. Increased electrochemical potentials produce larger voltage differences between the cathode and anode of a battery, which increases the electrochemically stored energy per unit mass of the battery. For high-power batteries, the ionic sources and sinks are connected to a separator by an element with large ionic conductivity, and to the current collectors with high electric conductivity elements.

Typical battery manufacturing involves numerous complex and costly processes carried out in series, each of which is subject to yield losses, incurs capital costs for equipment, and includes operating expenses for energy consumption and consumable materials. The process first involves making separate anodic and cathodic mixtures that are typically mixtures of electrochemically active ion storage compounds, electrically conductive additives, and polymer binders. The mixtures are coated onto the surfaces of flexible metal foils and subsequently compressed under high pressure to increase density and control thickness. These compressed electrode/foil composites are then slitted into sizes and/or shapes that are appropriate for the particular form factor of the manufactured battery. The slitted electrode composites are typically co-wound or co-stacked with intervening ionically-conductive/electronically-insulating separator membranes to construct battery windings, i.e. "jelly rolls" or "stacks," which are then packaged in metal cans, flexible polymer pouches, etc. The resulting cells can be infiltrated with liquid electrolyte that need be introduced in a carefully controlled environment.

The stored energy or charge capacity of a manufactured battery is related to the inherent charge capacity of the active materials (mAh/g), the volume of the electrodes ($cm^3$), the product of the thickness, area, and number of layers, and the loading of active material in the electrode media (e.g., grams of active material/cubic centimeters of electrode media. Therefore, to enhance commercial appeal (e.g., increased energy density and decreased cost), it is generally desirable to increase areal charge capacity ($mAh/cm^2$) of the electrodes that are to be disposed in a given battery form factor, which depends on electrode thickness and active material loading. Moreover, it is desirable to increase electrical conduction between the current collector and the electrode material. For example, it can be desirable to increase the surface area of the current collector that is in physical and/or electrical connection with a semi-solid electrode material.

Thus, a need exists for a semi-solid electrode having a porous current collector. A need also exists for a method of manufacturing a semi-solid electrode cell having a porous current collector.

SUMMARY

Apparatus, systems, and methods described herein relate to the manufacture and use of a semi-solid electrode cell having a porous current collector. In some embodiments, an electrochemical cell includes an anode, a semi-solid cathode, and a separator (e.g., an ion permeable membrane) disposed therebetween. The semi-solid cathode includes a porous current collector and a suspension of an active material and a conductive material disposed in a non-aqueous liquid electrolyte. The porous current collector is at least partially disposed within the suspension such that the suspension substantially encapsulates the porous current collector.

BRIEF DESCRIPTION OF THE DRAWINGS

FIGS. 8A and 8B illustrate a system for depositing a semi-solid electrode material on or at least partially within a porous current collector, according to an embodiment.

FIGS. 11A-11G illustrate a method of manufacturing an electrochemical cell with electrodes having a porous current collector, according to an embodiment.

FIG. 12 is a schematic illustration of multiple electrodes forming at least a portion of an electrochemical cell, according to an embodiment.

FIG. 13 is a schematic illustration of multiple electrodes forming at least a portion of an electrochemical cell, according to an embodiment.

DETAILED DESCRIPTION

Figure 1A:
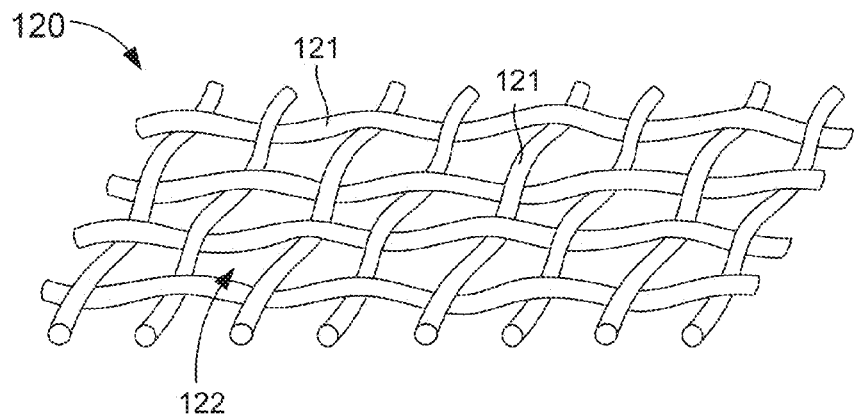
FIGS. 1A-1C are schematic illustrations of a porous current collector used in an electrochemical cell, according to an embodiment.

Embodiments described herein relate generally to the preparation of electrodes for use in electrochemical devices and more particularly to systems and methods of using a semi-solid electrode having a porous current collector in a battery module. In some embodiments, electrochemical devices (e.g., batteries) manufactured directly with a semi-solid suspension avoid the use of conventional binding agents and the electrode casting step altogether. Some benefits of this approach include, for example: (i) a simplified manufacturing process with less equipment (i.e., less capital intensive), (ii) the ability to manufacture electrodes of different thicknesses and shapes (e.g., by changing an extrusion die slot dimension), (iii) processing of thicker (>100 µm) and higher areal charge capacity ($mAh/cm^2$) electrodes, thereby decreasing the volume, mass, and cost contributions of inactive components with respect to active material, and (iv) the elimination of binding agents, thereby reducing tortuosity and increasing ionic conductivity of the electrode. Examples of battery architectures utilizing semi-solid suspensions are described in International Patent Publication No. WO 2012/024499, entitled "Stationary, Fluid Redox Electrode," and International Patent Publication No. WO 2012/088442, entitled "Semi-Solid Filled Battery and Method of Manufacture," the entire disclosures of which are hereby incorporated by reference.

Electrochemically active materials, and correspondingly the semi-solid suspensions of which they are a part, undergo volume change during charging and discharging. To the extent that the cell temperature changes, for example by way of ambient temperature or self-heating during operation, the electrode additionally experiences volume change associated with thermal expansion and contraction. Electrode designs wherein the dominant contact between electrode media and current collector is through a facial area (e.g. a flat foil), a common performance decay mechanism is delamination. Use of a porous current collector mitigates this and related effects. In some embodiments, the porous current collector functions as a scaffold for the semi-solid suspension, promoting sustained contact (mechanical, electrical, thermal) between the semi-solid suspension and the current collector.

As used herein, the term "semi-solid" refers to a material that is a mixture of liquid and solid phases, for example, such as a particle suspension, colloidal suspension, emulsion, gel, or micelle.

As used herein, the terms "condensed ion-storing liquid" or "condensed liquid" refers to a liquid that is not merely a solvent, as in the case of an aqueous flow cell catholyte or anolyte, but rather, that is itself redox-active. Of course, such a liquid form may also be diluted by or mixed with another, non-redox-active liquid that is a diluent or solvent, including mixing with such a diluent to form a lower-melting liquid phase, emulsion or micelles including the ion-storing liquid.

As used in this specification, the terms "about" and "approximately" generally include plus or minus 10% of the value stated. For example, about 5 would include 4.5 to 5.5, approximately 10 would include 9 to 11, and about 100 would include 90 to 110.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

In some embodiments, an electrochemical cell includes an anode, a semi-solid cathode, and an ion permeable membrane disposed therebetween. The semi-solid cathode includes a porous current collector, and a suspension of an active material and a conductive material disposed in a non-aqueous liquid electrolyte. The porous current collector is at least partially disposed within the suspension such that the suspension substantially encapsulates the porous current collector.

In some embodiments, an electrochemical cell includes an anode cavity at least partially defined by an ion permeable membrane, a first porous current collector, and an anode semi-solid suspension. The first porous current collector is disposed in the anode cavity such that the first porous current collector substantially fills the anode cavity. The anode semi-solid suspension is disposed within the anode cavity and is at least partially embedded in the first porous current collector. The electrochemical cell also includes a cathode cavity at least partially defined by the ion permeable membrane, a second porous current collector, and a cathode semi-solid suspension. The second porous current collector is disposed in the cathode cavity such that the second porous current collector substantially fills the cathode cavity. The cathode semi-solid suspension is disposed within the cathode cavity and is at least partially embedded in the second porous current collector. The ion permeable membrane is disposed between the anode cavity and the cathode cavity.

In some embodiments, an electrode includes a porous electronically conductive substrate and a semi-solid electrode material including an active material and a conductive material in a non-aqueous liquid electrolyte. The semi-solid electrode material is embedded in the porous substrate.

In some embodiments, a method of manufacturing an electrochemical cell includes transferring an anode semi-solid suspension to an anode cavity with a first porous electronically conductive current collector disposed therein. The method also includes transferring a cathode semi-solid suspension to a cathode cavity with a second porous electronically conductive current collector disposed therein. The method includes disposing an ion permeable membrane between the anode cavity and the cathode cavity and sealing the anode cavity and cathode cavity.

In some embodiments, a method of forming an electrode includes transferring onto an electronically conductive substrate a semi-solid electrode material having a suspension of an active material and a conductive material in a non-aqueous liquid electrolyte. The method includes lowering the temperature of the semi-solid electrode material below the freezing point of the non-aqueous liquid electrolyte.

The cathode and/or anode materials described herein can be a flowable semi-solid or condensed liquid composition. A flowable anodic semi-solid (also referred to herein as "anolyte") and/or a flowable cathodic semi-solid (also referred to herein as "catholyte") are/is comprised of a suspension of electrochemically-active agents (anode particulates and/or cathode particulates) and, optionally, electronically conductive particles (e.g., carbon). The cathodic particles and conductive particles are co-suspended in an electrolyte to produce a catholyte semi-solid. The anodic particles and conductive particles are co-suspended in an electrolyte to produce an anolyte semi-solid. The semi-solids are capable of flowing in response to an applied pressure differential, gravitational field, or other imposed acceleration field, that exerts or produces a force on the semi-solid, and optionally, with the aid of mechanical vibration.

In some embodiments, the anode and/or cathode particles have an effective diameter of at least 1 μm. In some embodiments, the cathode and/or anode particles have an effective diameter between approximately 1 μm and approximately 10 μm. In other embodiments, the cathode and/or anode particles have an effective diameter of at least 10 μm or more.

In some embodiments, in order to increase the particle packing density and therefore the energy density of the semi-solid suspension, while still maintaining a flowable semi-solid, the ion storage compound particles have a polydisperse size distribution in which the finest particles present in at least 5 vol % of the total volume, is at least a factor of 5 smaller than the largest particles present in at least 5 vol % of the total volume. In some embodiments, in order to increase the particle packing density and therefore the energy density of the semi-solid suspension, while still maintaining a flowable semi-solid, the ion storage compound particles have a bidisperse size distribution (i.e., with two maxima in the distribution of particle number versus particle size) in which the two maxima differ in size by at least a factor of 5.

In some embodiments, the size distribution of ion storage compound particles in the semi-solid is polydisperse, and the particle packing fraction is at least 50 vol %. In some embodiments, the particle packing fraction is between approximately 50 vol % and 70 vol %. In other embodiments, the particle packing fraction is at least 70 vol % or more.

In some embodiments, the particles have morphology that is at least equiaxed, and spherical, in order to increase the flowability and decrease the viscosity of the semi-solid suspension while simultaneously achieving high particle packing density. In some embodiments, the spherical particles are dense, and in other embodiments the spherical particles are porous. In some embodiments, the spherical particles are made by spray-drying a particle suspension to obtain spherical agglomerates of smaller particles.

In some embodiments, the particles of ion storage material used in the semi-solid suspension are sufficiently large that surface forces do not prohibit them from achieving high tap density while dry, and high packing density when formulated into a semi-solid suspension. In some embodiments, the particle size is at least 1 μm. In other embodiments, the particle size is between approximately 1 μm and approximately 10 μm. In other embodiments, the particle size is at least 10 μm or more.

In some embodiments, high particle packing density is achieved simultaneously with flowability and low viscosity by using dispersants and surfactants well-known to those skilled in the arts of ceramics processing and colloid chemistry. These additives may be, for example, organic molecules having a $C_6$ to $C_{12}$ backbone used to provide steric forces when adsorbed on the particles. Examples of such additives include stearic acid, and the commercially available surfactant Triton-X-100.

In some embodiments, a redox mediator is used to improve charge transfer within the semi-solid suspension. In some embodiments, the redox mediator is based on $Fe^{2+}$ or $V^{2+}$, $V^{3+}$, or $V^{4+}$. In one embodiment, the redox mediator is ferrocene.

In some embodiments, dissolved redox ions can be used, as in a conventional aqueous or non-aqueous flow battery, but in such embodiments, the anolyte and/or catholyte has an increased solubility for such ions by using an ionic liquid as the solvent. In some embodiments, the redox chemistry is Fe—Cr, vanadium redox, or a zinc-halogen chemistry.

In some embodiments, the conductive particles have shapes, which may include spheres, platelets, or rods to optimize solids packing fraction, increase the semi-solid's net electronic conductivity, and improve rheological behavior of the semi-solids. Low aspect or substantially equiaxed particles tend to flow well, however, they tend to have a low packing density.

In some embodiments, the particles have a plurality of sizes so as to increase packing fraction by placing smaller particles in the interstices of the larger particles. In particular, the particle size distribution can be bimodal, in which the average particle size of the larger particle mode is at least 5 times larger than the average particle size of the smaller particle mode. The mixture of large and small particles improves flow of the material during cell loading and increases solid volume fraction and packing density in the loaded cell.

In some embodiments, the nature of suspension can be modified prior to and subsequent to injection of the semi-solid into the unfilled-battery-subassembly receptacles in order to facilitate flow during loading and packing density in the loaded cell.

In some embodiments, the particle suspension is initially stabilized by repulsive interparticle steric forces that arise from surfactant molecules. After the particle suspension is injected into the unfilled-battery-subassembly receptacles, chemical or heat treatments can cause these surface molecules to collapse or evaporate and promote densification. In some embodiments, the suspension's steric forces are modified intermittently during injection.

For example, the particle suspension can be initially stabilized by repulsive interparticle electrostatic double layer forces to decrease viscosity. The repulsive force reduces interparticle attraction and reduces agglomeration. After the particle suspension is injected into the unfilled-battery-subassembly receptacles, the surface of the particles can be further modified to reduce interparticle repulsive forces and thereby promote particle attraction and packing For example, ionic solutions such as salt solutions can be added to the suspension to reduce the repulsive forces and promote aggregation and densification so as to produce increased solids fraction loading after injection. In some embodiments, salt is added intermittently during suspension injection to increase density in incremental layers.

In some embodiments, the cell compartments are loaded with a particle suspension that is stabilized by repulsive forces between particles induced by an electrostatic double layer or short-range steric forces due to added surfactants or dispersants. Following loading, the particle suspension is aggregated and densified by increasing the salt concentration of the suspension. In some embodiments, the salt that is added is a salt of a working ion for the battery (e.g., a lithium salt for a lithium ion battery) and upon being added, causes the liquid phase to become an ion-conducting electrolyte. The liquid phase comprises a solvent that is then used as the solvent component of the electrolyte (e.g., for a lithium rechargeable battery, may be one or more alkyl carbonates, or one or more ionic liquids). Upon increasing the salt concentration, the electrical double layer causing repulsion between the particles is "collapsed," and attractive interactions cause the particles to floc, aggregate, consolidate, or otherwise densify. This allows the electrode of the battery to be formed from the suspension while it has a low viscosity, for instance by pouring, injecting, or pumping into the chamber that forms a net-shaped electrode, and then allows particles within the suspension to be consolidated for improved electrical conduction, higher packing density, and longer service life.

In some embodiments, the injectable and flowable semi-solid is caused to become non-flowable by "fixing." In some embodiments, fixing is performed by action of photo-polymerization. In some embodiments, fixing is performed by action of electromagnetic radiation with wavelengths that are transmitted by the unfilled-battery-subassembly. In some specific embodiments, one or more additives are added to the flowable semi-solid to facilitate the fixing of the flowable semi-solid.

In some embodiments, the injectable and flowable semi-solid is caused to become non-flowable by "plasticizing." In some embodiments, the rheological properties of the injectable and flowable semi-solid are modified by addition of a thinner, a thickener, or a plasticizing agent. In some specific embodiments, these agents promote processability and help retain compositional uniformity of the semi-solid under flowing conditions and compartment filling operations. In some specific embodiments, one or more additives are added to the flowable semi-solid to adjust its flow properties to accommodate processing requirements.

Semi-Solid Composition

In some embodiments, the anolyte and catholyte semi-solids provide a means to produce a substance that functions collectively as an ion-storage/ion-source, electron conductor, and ionic conductor in a single medium that acts as a working electrode.

Any anolyte and/or catholyte semi-solid ion-storing redox composition as described herein can have, when taken in moles per liter (molarity), at least 10M concentration of redox species. In some embodiments, any anolyte and/or catholyte semi-solids ion-storing redox composition can have at least 12M, at least 15M, or at least 20M. The electrochemically active material can be an ion storage material or any other compound or ion complex that is capable of undergoing Faradaic reaction in order to store energy. The electroactive material can also be a multiphase material including the above-described redox-active solid mixed with a non-redox-active phase, including solid-liquid suspensions, or liquid-liquid multiphase mixtures, including micelles or emulsions having a liquid ion-storage material intimately mixed with a supporting liquid phase. Systems that utilize various working ions can include aqueous systems in which $H^+$ or $OH^-$ are the working ions, non-aqueous systems in which $Li^+$, $Na^+$, or other alkali ions are the working ions, even alkaline earth working ions such as $Ca^{2+}$ and $Mg^{2+}$, or $Al^{3+}$. In each of these instances, a negative electrode storage material and a positive electrode storage material may be required, the negative electrode storing the working ion of interest at a lower absolute electrical potential than the positive electrode. The cell voltage can be determined approximately by the difference in ion-storage potentials of the two ion-storage electrode materials.

Systems employing both negative and positive ion-storage materials are particularly advantageous because there are no additional electrochemical byproducts in the cell. Both the positive and negative electrodes materials are insoluble in the flow electrolyte and the electrolyte does not become contaminated with electrochemical composition products that must be removed and regenerated. In addition, systems employing both negative and positive lithium ion-storage materials are particularly advantageous when using non-aqueous electrochemical compositions.

In some embodiments, the semi-solid ion-storing redox compositions include materials proven to work in conventional, solid lithium-ion batteries. In some embodiments, the positive semi-solid electroactive material contains lithium positive electroactive materials and the lithium cations are shuttled between the negative electrode and positive electrode, intercalating into solid, host particles suspended in a liquid electrolyte.

In some embodiments at least one of the energy storage electrodes includes a condensed ion-storing liquid of a redox-active compound, which may be organic or inorganic, and includes but is not limited to lithium metal, sodium metal, lithium-metal alloys, gallium and indium alloys with or without dissolved lithium, molten transition metal chlorides, thionyl chloride, and the like, or redox polymers and organics that are liquid under the operating conditions of the battery. Such a liquid form may also be diluted by or mixed with another, non-redox-active liquid that is a diluent or solvent, including mixing with such diluents to form a lower-melting liquid phase. However, unlike a conventional flow cell catholyte or anolyte, the redox-active component will comprise, by mass, at least 10% of the total mass of the flowable electrolyte. In other embodiments, the redox-active component will comprise, by mass, between approximately 10% and 25% of the total mass of the flowable electrolyte. In other embodiments, the redox-active component will comprise, by mass, at least 25% or more of the total mass of the flowable electrolyte.

In some embodiments, the redox-active electrode material, whether used as a semi-solid or a condensed liquid format as defined above, comprises an organic redox compound that stores the working ion of interest at a potential useful for either the positive or negative electrode of a battery. Such organic redox-active storage materials include "p"-doped conductive polymers such as polyaniline or polyacetylene based materials, polynitroxide or organic radical electrodes (such as those described in: H. Nishide et al., Electrochim. *Acta,* 50, 827-831, (2004), and K. Nakahara, et al., *Chem. Phys. Lett.,* 359, 351-354 (2002)), carbonyl based organics, and oxocarbons and carboxylate, including compounds such as $Li_2C_6O_6$, $Li_2C_8H_4O_4$, and $Li_2C_6H_4O_4$ (see for example M. Armand et al., *Nature Materials,* DOI: 10.1038/nmat2372) and organosulfur compounds.

In some embodiments, organic redox compounds that are electronically insulating are used. In some instance, the redox compounds are in a condensed liquid phase such as liquid or flowable polymers that are electronically insulating. In such cases, the redox active slurry may or may not contain an additional carrier liquid. Additives can be combined with the condensed phase liquid redox compound to increase electronic conductivity. In some embodiments, such electronically insulating organic redox compounds are rendered electrochemically active by mixing or blending with particulates of an electronically conductive material, such as solid inorganic conductive materials including but not limited to metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments.

In some embodiments, such electronically insulating organic redox compounds are rendered electronically active by mixing or blending with an electronically conductive polymer, including but not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes. The conductive additives form an electrically conducting framework within the insulating liquid redox compounds that significantly increases the electrically conductivity of the composition. In some embodiments, the conductive addition forms a percolative pathway to the current collector.

In some embodiments the redox-active electrode material comprises a sol or gel, including for example metal oxide sols or gels produced by the hydrolysis of metal alkoxides, amongst other methods generally known as "sol-gel processing." Vanadium oxide gels of composition $V_xO_y$ are amongst such redox-active sol-gel materials.

Other suitable positive active materials include solid compounds known to those skilled in the art as those used in NiMH (Nickel-Metal Hydride) Nickel Cadmium (NiCd) batteries. Still other positive electrode compounds for Li storage include those used in carbon monofluoride batteries, generally referred to as CFx, or metal fluoride compounds having approximate stoichiometry $MF_2$ or $MF_3$ where M comprises Fe, Bi, Ni, Co, Ti, V. Examples include those described in H. Li, P. Balaya, and J. Maier, Li-Storage via Heterogeneous Reaction in Selected Binary Metal Fluorides and Oxides, *Journal of The Electrochemical Society*, 151 [11] A1878-A1885 (2004), M. Bervas, A. N. Mansour, W.-S. Woon, J. F. Al-Sharab, F. Badway, F. Cosandey, L. C. Klein, and G. G. Amatucci, "Investigation of the Lithiation and Delithiation Conversion Mechanisms in a Bismuth Fluoride Nanocomposites", J. Electrochem. Soc., 153, A799 (2006), and I. Plitz, F. Badway, J. Al-Sharab, A. DuPasquier, F. Cosandey and G. G. Amatucci, "Structure and Electrochemistry of Carbon-Metal Fluoride Nanocomposites Fabricated by a Solid State Redox Conversion Reaction", *J. Electrochem. Soc.*, 152, A307 (2005).

As another example, fullerenic carbon including single-wall carbon nanotubes (SWNTs), multiwall carbon nanotubes (MWNTs), or metal or metalloid nanowires may be used as ion-storage materials. One example is the silicon nanowires used as a high energy density storage material in a report by C. K. Chan, H. Peng, G. Liu, K. McIlwrath, X. F. Zhang, R. A. Huggins, and Y. Cui, High-performance lithium battery anodes using silicon nanowires, *Nature Nanotechnology*, published online 16 Dec. 2007; doi: 10.1038/nnano.2007.411.

Exemplary electroactive materials for the positive electrode in a lithium system include the general family of ordered rocksalt compounds $LiMO_2$ including those having the $\alpha$-NaFeO$_2$ (so-called "layered compounds") or orthorhombic-LiMnO$_2$ structure type or their derivatives of different crystal symmetry, atomic ordering, or partial substitution for the metals or oxygen. M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, Li(Ni, Co, Al)O$_2$ (known as "NCA") and Li(Ni, Mn, Co)O$_2$ (known as "NMC"). Other families of exemplary electroactive materials includes those of spinel structure, such as $LiMn_2O_4$ and its derivatives, so-called "layered-spinel nanocomposites" in which the structure includes nanoscopic regions having ordered rocksalt and spinel ordering, olivines $LiMPO_4$ and their derivatives, in which M comprises one or more of Mn, Fe, Co, or Ni, partially fluorinated compounds such as $LiVPO_4F$, other "polyanion" compounds as described below, and vanadium oxides $V_xO_y$ including $V_2O_5$ and $V_6O_{11}$.

In one or more embodiments the active material comprises a transition metal polyanion compound, for example as described in U.S. Pat. No. 7,338,734. In one or more embodiments the active material comprises an alkali metal transition metal oxide or phosphate, and for example, the compound has a composition $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, and have values such that x, plus y(1−a) times a formal valence or valences of M', plus ya times a formal valence or valence of M", is equal to z times a formal valence of the $XD_4$, $X_2D_7$, or $DXD_4$ group; or a compound comprising a composition $(A_{1-a}M''_a)_xM'_y(XD_4)_z$, $(A_{1-a}M''_a)_xM'_y(DXD_4)z(A_{1-a}M''_a)_x M'_y(X_2D_7)_z$ and have values such that (1−a)x plus the quantity ax times the formal valence or valences of M" plus y times the formal valence or valences of M' is equal to z times the formal valence of the $XD_4$, $X_2D_7$ or $DXD_4$ group. In the compound, A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen. The positive electroactive material can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material comprises a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In other embodiments, the lithium transition metal phosphate material has an overall composition of $Li_{1-x-z}M_{1+z}PO_4$, where M comprises at least one first row transition metal selected from the group consisting of Ti, V, Cr, Mn, Fe, Co and Ni, where x is from 0 to 1 and z can be positive or negative. M includes Fe, z is between about 0.15 and −0.15. The material can exhibit a solid solution over a composition range of 0<x<0.15, or the material can exhibit a stable solid solution over a composition range of x between 0 and at least about 0.05, or the material can exhibit a stable solid solution over a composition range of x between 0 and at least about 0.07 at room temperature (22-25° C.). The material may also exhibit a solid solution in the lithium-poor regime, e.g., where x≥0.8, or x≥0.9, or x≥0.95.

In some embodiments the redox-active electrode material comprises a metal salt that stores an alkali ion by undergoing a displacement or conversion reaction. Examples of such compounds include metal oxides such as CoO, $Co_3O_4$, NiO, CuO, MnO, typically used as a negative electrode in a lithium battery, which upon reaction with Li undergo a displacement or conversion reaction to form a mixture of $Li_2O$ and the metal constituent in the form of a more reduced oxide or the metallic form. Other examples include metal fluorides such as $CuF_2$, $FeF_2$, $FeF_3$, $BiF_3$, $CoF_2$, and $NiF_2$, which undergo a displacement or conversion reaction to form LiF and the reduced metal constituent. Such fluorides may be used as the positive electrode in a lithium battery. In other embodiments the redox-active electrode material comprises carbon monofluoride or its derivatives. In some embodiments the material undergoing displacement or conversion reaction is in the form of particulates having on average dimensions of 100 nanometers or less. In some embodiments the material undergoing displacement or conversion reaction comprises a nanocomposite of the active material mixed with an inactive host, including but not limited to conductive and relatively ductile compounds such as carbon, or a metal, or a metal sulfide. $FeS_2$ and $FeF_3$ can also be used as cheap and electronically conductive active materials in a non-aqueous or aqueous lithium system.

In some embodiments, the working ion is selected from the group consisting of $L^+$, $Na^+$, $H^+$, $Mg^{2+}$, $Al^{3+}$, or $Ca^{2+}$.

In some embodiments, the working ion is selected from the group consisting of $Li^+$ or $Na^+$.

In some embodiments, the flowable semi-solid ion-storing redox composition includes a solid including an ion storage compound.

In some embodiments, the ion is proton or hydroxyl ion and the ion storage compound includes those used in a nickel-cadmium or nickel metal hydride battery.

In some embodiments, the ion is lithium and the ion storage compound is selected from the group consisting of metal fluorides such as $CuF_2$, $FeF_2$, $FeF_3$, $BiF_3$, $CoF_2$, and $NiF_2$.

In some embodiments, the ion is lithium and the ion storage compound is selected from the group consisting of metal oxides such as CoO, $Co_3O_4$, NiO, CuO, MnO.

In some embodiments, the ion is lithium and the ion storage compound includes an intercalation compound selected from compounds with formula $Li_{1-x-z}M_{1-z}PO_4$, wherein M includes at least one first row transition metal selected from the group consisting of Ti, V, Cr, Mn, Fe, Co and Ni, wherein x is from 0 to 1 and z can be positive or negative.

In some embodiments, the ion is lithium and the ion storage compound includes an intercalation compound selected from compounds with formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In some embodiments, the ion is lithium and the ion storage compound includes an intercalation compound selected from compounds with formula $LiMPO_4$, where M is one or more of V, Cr, Mn, Fe, Co, and Ni, in which the compound is optionally doped at the Li, M or O-sites.

In some embodiments, the ion is lithium and the ion storage compound includes an intercalation compound selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)_z$, wherein x, plus y(1−a) times a formal valence or valences of M', plus ya times a formal valence or valence of M'', is equal to z times a formal valence of the $XD_4$, $X_2D_7$, or $DXD_4$ group; and A is at least one of an alkali metal and hydrogen, M' is a first-row transition metal, X is at least one of phosphorus, sulfur, arsenic, molybdenum, and tungsten, M'' any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the ion storage compound includes an intercalation compound selected from the group consisting of $A_{1-a}M''_a)_xM'_y(XD_4)_z$, $(A_{1-a}M''_a)_xM'_y(DXD_4)z$ and $A_{1-a}M''_a)_xM'_y(X_2D_7)_z$, where (1−a)x plus the quantity ax times the formal valence or valences of M'' plus y times the formal valence or valences of M' is equal to z times the formal valence of the $XD_4$, $X_2D_7$ or $DXD_4$ group, and A is at least one of an alkali metal and hydrogen, M' is a first-row transition metal, X is at least one of phosphorus, sulfur, arsenic, molybdenum, and tungsten, M'' any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the ion storage compound includes an intercalation compound selected from the group consisting of ordered rocksalt compounds $LiMO_2$ including those having the α-$NaFeO_2$ and orthorhombic-$LiMnO_2$ structure type or their derivatives of different crystal symmetry, atomic ordering, or partial substitution for the metals or oxygen, where M includes at least one first-row transition metal but may include non-transition metals including but not limited to Al, Ca, Mg, or Zr.

In some embodiments, the flowable semi-solid ion-storing redox composition includes a solid including amorphous carbon, disordered carbon, graphitic carbon, or a metal-coated or metal-decorated carbon.

In some embodiments, the flowable semi-solid ion-storing redox composition includes a solid including a metal or metal alloy or metalloid or metalloid alloy or silicon.

In some embodiments, the flowable semi-solid ion-storing redox composition includes a solid including nanostructures including nanowires, nanorods, and nanotetrapods.

In some embodiments, the flowable semi-solid ion-storing redox composition includes a solid including an organic redox compound.

In some embodiments, the positive electrode includes a flowable semi-solid ion-storing redox composition including a solid selected from the group consisting of ordered rock-salt compounds $LiMO_2$ including those having the α-$NaFeO_2$ and orthorhombic-$LiMnO_2$ structure type or their derivatives of different crystal symmetry, atomic ordering, or partial substitution for the metals or oxygen, wherein M includes at least one first-row transition metal but may include non-transition metals including but not limited to Al, Ca, Mg, or Zr and the negative electrode includes a flowable semi-solid ion-storing redox composition including a solid selected from the group consisting of amorphous carbon, disordered carbon, graphitic carbon, or a metal-coated or metal-decorated carbon.

In some embodiments, the positive electrode includes a flowable semi-solid ion-storing redox composition including a solid selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)_z$, and where x, plus y(1−a) times a formal valence or valences of M', plus ya times a formal valence or valence of M'', is equal to z times a formal valence of the $XD_4$, $X_2D_7$, or $DXD_4$ group, and A is at least one of an alkali metal and hydrogen, M' is a first-row transition metal, X is at least one of phosphorus, sulfur, arsenic, molybdenum, and tungsten, M'' any of a Group IIA, IIIA, IVA, VA, VIA, VIIA, VIIIA, IB, IIB, IIIB, IVB, VB, and VIB metal, D is at least one of oxygen, nitrogen, carbon, or a halogen and the negative electrode includes a flowable semi-solid ion-storing redox composition including a solid selected from the group consisting of amorphous carbon, disordered carbon, graphitic carbon, or a metal-coated or metal-decorated carbon.

In some embodiments, the positive electrode includes a flowable semi-solid ion-storing redox composition including a compound with a spinel structure.

In some embodiments, the positive electrode includes a flowable semi-solid ion-storing redox composition including a compound selected from the group consisting of $LiMn_2O_4$ and its derivatives; layered-spinel nanocomposites in which the structure includes nanoscopic regions having ordered rocksalt and spinel ordering; so-called "high voltage spinels" with a potential vs. Li/Li+ that exceeds 4.3V including but not limited to LiNi0.5Mn1.5O4; olivines $LiMPO_4$ and their derivatives, in which M includes one or more of Mn, Fe, Co, or Ni, partially fluorinated compounds such as $LiVPO_4F$, other "polyanion" compounds, and vanadium oxides $V_xO_y$, including $V_2O_5$ and $V_6O_{11}$.

In some embodiments the semi-solid flow battery is a lithium battery, and the negative electrode active compound comprises graphite, graphitic boron-carbon alloys, hard or disordered carbon, lithium titanate spinel, or a solid metal or metal alloy or metalloid or metalloid alloy that reacts with lithium to form intermetallic compounds, including the metals Sn, Bi, Zn, Ag, and Al, and the metalloids Si and Ge.

Exemplary electroactive materials for the negative electrode in the case of a lithium working ion include graphitic or non-graphitic carbon, amorphous carbon, or mesocarbon microbeads; an unlithiated metal or metal alloy, such as metals including one or more of Ag, Al, Au, B, Ga, Ge, In, Sb, Sn, Si, or Zn, or a lithiated metal or metal alloy including such compounds as $LiAl$, $Li_9Al_4$, $Li_3Al$, $LiZn$, $LiAg$, $Li_{10}Ag_3$, $Li_5B_4$, $Li_7B_6$, $Li_{12}Si_7$, $Li_{21}Si_8$, $Li_{13}Si_4$, $Li_{21}Si_5$, $Li_5Sn_2$, $Li_{13}Sn_5$, $Li_7Sn_2$, $Li_{22}Sn_5$, $Li_2Sb$, $Li_3Sb$, $LiBi$, or $Li_3Bi$, or amorphous metal alloys of lithiated or non-lithiated compositions.

In some embodiments, the negative electrode includes a semi-solid ion-storing redox composition including graphite, graphitic boron-carbon alloys, hard or disordered carbon, lithium titanate spinel, or a solid metal or metal alloy or metalloid or metalloid alloy that reacts with lithium to form intermetallic compounds, including the metals Sn, Bi, Zn, Ag, and Al, and the metalloids Si and Ge.

The current collector is electronically conductive and should be electrochemically inactive under the operation conditions of the cell. Typical current collectors for lithium cells include copper, aluminum, or titanium for the negative current collector and aluminum for the positive current collector, in the form of sheets or mesh, or any configuration for which the current collector may be distributed in the electrolyte and permit fluid flow. Selection of current collector materials is well-known to those skilled in the art. In some embodiments, aluminum is used as the current collector for positive electrode. In some embodiments, copper is used as the current collector for negative electrode. In other embodiments, aluminum is used as the current collector for negative electrode.

In some embodiments, the negative electrode can be a conventional stationary electrode, while the positive electrode includes a semi-solid redox composition. In other embodiments, the positive electrode can be a conventional stationary electrode, while the negative electrode includes a semi-solid redox composition.

Current collector materials can be selected to be stable at the operating potentials of the positive and negative electrodes of the flow battery. In non-aqueous lithium systems the positive current collector may comprise aluminum, or aluminum coated with conductive material that does not electrochemically dissolve at operating potentials of 2.5-5V with respect to Li/Li+. Such materials include Pt, Au, Ni, conductive metal oxides such as vanadium oxide, and carbon. The negative current collector may comprise copper or other metals that do not form alloys or intermetallic compounds with lithium, carbon, and coatings comprising such materials on another conductor.

In some embodiments, the electrochemical function of the semi-solids redox cell is improved by mixing or blending the anode or cathode particles with particulates of an electronically conductive material, such as solid inorganic conductive materials including but not limited to metals, metal carbides, metal nitrides, metal oxides, and allotropes of carbon including carbon black, graphitic carbon, carbon fibers, carbon microfibers, vapor-grown carbon fibers (VGCF), fullerenic carbons including "buckyballs", carbon nanotubes (CNTs), multiwall carbon nanotubes (MWNTs), single wall carbon nanotubes (SWNTs), graphene sheets or aggregates of graphene sheets, and materials comprising fullerenic fragments. In some embodiments, such electronically insulating organic redox compounds are rendered electronically active by mixing or blending with an electronically conductive polymer, including but not limited to polyaniline or polyacetylene based conductive polymers or poly(3,4-ethylenedioxythiophene) (PEDOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes).). In some embodiments, the resulting catholyte or anolyte mixture has an electronic conductivity of at least about $10^{-6}$ S/cm. In other embodiments, the mixture has an electronic conductivity between approximately $10^{-6}$ S/cm and $10^{-3}$ S/cm. In other embodiments, the mixture has an electronic conductivity of at least about $10^{-5}$ S/cm, or at least about $10^{-4}$ S/cm, of at least about $10^{-3}$ S/cm or more.

In some embodiments, the anodic or cathodic particles can be caused to have a partial or full conductive coating.

In some embodiments, the semi-solid ion-storing redox composition includes an ion-storing solid coated with a conductive coating material. In certain specific embodiments, the conductive coating material has higher electron conductivity than the solid. In certain specific embodiments, the solid is graphite and the conductive coating material is a metal, metal carbide, metal oxide, metal nitride, or carbon. In certain specific embodiments, the metal is copper.

In some embodiments, the solid of the semi-solid ion-storing material is coated with metal that is redox-inert at the operating conditions of the redox energy storage device. In some embodiments, the solid of the semi-solid ion-storing material is coated with copper to increase the conductivity of the storage material particle, to increase the net conductivity of the semi-solid, and/or to facilitate charge transfer between energy storage particles and conductive additives. In some embodiments, the storage material particle is coated with, about 1.5% by weight, metallic copper. In some embodiments, the storage material particle is coated with, about 3.0% by weight, metallic copper. In some embodiments, the storage material particle is coated with, about 8.5% by weight, metallic copper. In some embodiments, the storage material particle is coated with, about 10.0% by weight, metallic copper. In some embodiments, the storage material particle is coated with, about 15.0% by weight, metallic copper. In some embodiments, the storage material particle is coated with, about 20.0% by weight, metallic copper.

In some embodiments, the conductive coating is placed on the anodic or cathodic particles by chemical precipitation of the conductive element and subsequent drying and/or calcination.

In some embodiments, the conductive coating is placed on the anodic or cathodic particles by electroplating (e.g., within a fluidized bed).

In some embodiments, the conductive coating is placed on the anodic or cathodic particles by co-sintering with a conductive compound and subsequent comminution.

In some embodiments, the electrochemically active particles have a continuous intraparticle conductive material or are embedded in a conductive matrix.

In some embodiments, a conductive coating and intraparticulate conductive network is produced by multicomponent-spray-drying a semi-solid of anode/cathode particles and conductive material particulates.

In some embodiments, conductive polymers are among the components semi-solid and provide an electronically conductive element. In some embodiments, the conductive polymers are one or more of: polyacetylene, polyaniline, polythiophene, polypyrrole, poly(p-phenylene), poly(triphenylene), polyazulene, polyfluorene, polynaphtalene, polyanthracene, polyfuran, polycarbazole, polyacenes, poly(heteroacenes). In some embodiments, the conductive polymer is a compound that reacts in-situ to form a conductive polymer on the surface of active materials particles. In one embodiment, the compound is 2-hexylthiophene or 3-hexylthiophene and oxidizes during charging of the battery to form a conductive polymer coating on solid particles in the cathode semi-solid suspension. In other embodiments, redox active material can be embedded in conductive matrix. The redox active material can coat the exterior and interior interfaces in a flocculated or agglomerated particulate of conductive material. In other embodiments, the redox-active material and the conductive material can be two components of a composite particulate. Without being bound by any theory or mode of operation, such coatings can pacify the redox active particles and can help prevent undesirable reactions with carrier liquid or electrolyte. As such, it can serve as a synthetic solid-electrolyte interphase (SEI) layer.

In some embodiments, inexpensive iron compounds such as pyrite ($FeS_2$) are used as inherently electronically conductive ion storage compounds. In one embodiment, the ion that is stored is Li+.

In some embodiments, redox mediators are added to the semi-solid to improve the rate of charge transfer within the semi-solid electrode. In some embodiments, this redox mediator is ferrocene or a ferrocene-containing polymer. In some embodiments, the redox mediator is one or more of tetrathiafulvalene-substituted polystyrene, ferrocene-substituted polyethylene, carbazole-substituted polyethylene.

In some embodiments, the surface conductivity or charge-transfer resistance of current collectors used in the semi-solid battery is increased by coating the current collector surface with a conductive material. Such layers can also serve as a synthetic SEI layer. Non-limiting examples of conductive-coating material include carbon, a metal, metal carbide, metal nitride, metal oxide, or conductive polymer. In some embodiments, the conductive polymer includes but is not limited to polyaniline or polyacetylene based conductive polymers or poly(3,4-ethylenedioxythiophene) (PE-DOT), polypyrrole, polythiophene, poly(p-phenylene), poly(triphenylene), polyazulene, polyfluorene, polynaphtalene, polyanthracene, polyfuran, polycarbazole, tetrathiafulvalene-substituted polystyrene, ferrocence-substituted polyethylene, carbazole-substituted polyethylene, polyoxyphenazine, polyacenes, or poly(heteroacenes). In some embodiments, the conductive polymer is a compound that reacts in-situ to form a conductive polymer on the surface of the current collector. In one embodiment, the compound is 2-hexylthiophene and oxidizes at a high potential to form a conductive polymer coating on the current collector. In some embodiments, the current collector is coated with metal that is redox-inert at the operating conditions of the redox energy storage device.

The semi-solid redox compositions can include various additives to improve the performance of the redox cell. The liquid phase of the semi-solids in such instances would comprise a solvent, in which is dissolved an electrolyte salt, and binders, thickeners, or other additives added to improve stability, reduce gas formation, improve SEI formation on the negative electrode particles, and the like. Examples of such additives include vinylene carbonate (VC), vinylethylene carbonate (VEC), fluoroethylene carbonate (FEC), or alkyl cinnamates, to provide a stable passivation layer on the anode or thin passivation layer on the oxide cathode; propane sultone (PS), propene sultone (PrS), or ethylene thiocarbonate as antigassing agents; biphenyl (BP), cyclohexylbenzene, or partially hydrogenated terphenyls, as gassing/safety/cathode polymerization agents; or lithium bis(oxatlato)borate as an anode passivation agent.

In some embodiments, the non-aqueous positive and negative electrode semi-solids redox compositions are prevented from absorbing impurity water and generating acid (such as HF in the case of $LiPF_6$ salt) by incorporating compounds that getter water into the active material suspension or into the storage tanks or other plumbing of the system. Optionally, the additives are basic oxides that neutralize the acid. Such compounds include but are not limited to silica gel, calcium sulfate (for example, the product known as Drierite), aluminum oxide and aluminum hydroxide.

EXAMPLE 1

Semi-solid Filled Cell Using Lithium Metal Oxides for Electrode Materials

Preparation of a Non-aqueous Lithium Titanate Spinel Anode Semi-solid:

A suspension containing 8% by volume of lithium titanium oxide ($Li_4Ti_5O_{12}$) and 8% by volume carbon black as the conductive additive in 84% by volume of a non-aqueous electrolyte consisting of $LiPF_6$ in a mixture of alkyl carbonates was prepared by first mixing 0.7 g $Li_4Ti_5O_{12}$ and 0.44 g of carbon black in the dry state using a TURBULA shaker-mixer for 1 hr. 2.5 ml of the electrolyte was then added and the mixture was sonicated for 1 hr.

Preparation of a Non-aqueous Cobalt Oxide Cathode Semi-solid:

Suspensions containing 12% by volume of lithium cobalt oxide ($LiCoO_2$), 8% by volume of carbon black, and the balance being an electrolyte consisting of $LiPF_6$ in a mixture of alkyl carbonates, were prepared. 1.05 g of lithium cobalt oxide was mixed with 0.22 g of the carbon using a turbula mixture for 1 hr. Afterwards, the electrolyte was added in the appropriate amount to make up the balance of the semi-solid suspension, and mixture was sonicated for 1 hr.

Some embodiments described herein relate to a semi-solid suspension with greater than about 45% active material by volume. Additionally, in some embodiments, a sufficient quantity of a conductive additive (e.g., carbon black) can be added to the slurry to improve electrical conductivity and electrochemical performance of the electrode. Furthermore, some embodiments described herein relate to a repeatable, scalable, manufacturing-oriented formulation process.

In some embodiments, an electrochemically active semi-solid suspension can include about 20% to about 75% by volume of a cathode or anode ion storage component, about 0.5% to about 25% by volume of a conductive additive component, and about 25% to about 70% by volume of an electrolyte.

In some embodiments, slurry components can be mixed in a batch process (e.g., with a batch mixer), with a specific spatial and/or temporal ordering of component addition, as described in more detail herein. In some embodiments, slurry components can be mixed in a continuous process (e.g. in an extruder), with a specific spatial and/or temporal ordering of component addition.

In some embodiments, process conditions (temperature; shear rate or rate schedule; component addition sequencing, location, and rate; mixing or residence time) can be selected and/or modified to control the electrical, rheological, and/or compositional (e.g., uniformity) properties of the prepared slurry. In some embodiments, the mixing element (e.g., roller blade edge) velocity is between about 0.5 cm/s and about 50 cm/s. In some embodiments, the minimum gap between which fluid is being flowed in the mixing event (e.g. distance from roller blade edge to mixer containment wall) is between about 0.05 mm and about 5 mm. Therefore, the shear rate (velocity scale divided by length scale) is accordingly between about 1 and about 10,000 inverse seconds. In some embodiments, the shear rate can be less than 1 inverse second, and in other embodiments, the shear rate is greater than 10,000 inverse seconds.

For example, the process conditions can be selected to produce a prepared slurry having a mixing index of at least about 0.80, at least about 0.90, at least about 0.95, or at least about 0.975. In some embodiments, the process conditions can be selected to produce a prepared slurry having an electronic conductivity of at least about $10^{-6}$ S/cm, at least about $10^{-5}$ S/cm, at least about $10^{-4}$ S/cm, at least about $10^{-3}$ S/cm, or at least about $10^{-2}$ S/cm. In some embodiments, the process conditions can be selected to produce a prepared slurry having an apparent viscosity at room temperature of less than about 100,000 Pa-s, less than about 10,000 Pa-s, or less than about 1,000 Pa-s, all at an apparent sheer rate of 1,000 $s^{-1}$. In some embodiments, the process conditions can be selected to produce a prepared slurry having two or more properties as described herein.

The mixing and forming of a slurry electrode generally includes: (i) raw material conveyance and/or feeding, (ii) mixing, (iii) mixed slurry conveyance, (iv) dispensing and/or extruding, and (v) forming. In some embodiments, multiple steps in the process can be performed at the same time and/or with the same piece of equipment. For example, the mixing and conveyance of the slurry can be performed at the same time with an extruder. Each step in the process can include one or more possible embodiments. For example, each step in the process can be performed manually or by any of a variety of process equipment. Each step can also include one or more sub-processes and, optionally, an inspection step to monitor process quality.

Raw material conveyance and/or feeding can include: batch based manual weighing of material with natural feeding (e.g., allowing the mixer to accept material into the mixture without external force), batch based manual weighing of material with forced feeding either by a piston mechanism or a screw-based "side stuffer," gravimetric screw solids feeders with natural feeding (e.g., feed at the rate which the mixer can naturally accept material), gravimetric screw solids feeders with forced feeding (e.g., units sold by Brabender Industries Inc combined with a piston mechanism or a screw-based 'side stuffer'), and/or any other suitable conveyance and/or feeding methods and/or any suitable combination thereof.

In some embodiments, the slurry can be mixed using a Banburry® style batch mixer, a mixing section of a twin screw extruder, a centrifugal planetary mixer, and/or a planetary mixer. In some embodiments, the slurry can be sampled and/or monitored after mixing to measure and/or evaluate homogeneity, rheology, conductivity, viscosity, and/or density.

In some embodiments, for example after mixing, the slurry can be conveyed and/or pressurized, for example using a piston pump, peristaltic pump, gear/lobe pump, progressing cavity pump, single screw extruder, conveying section of a twin screw extruder, and/or any other suitable conveying device. In some embodiments, the torque and/or power of the conveying device, the pressure at the conveying device exit, the flow rate, and/or the temperature can be measured, monitored and/or controlled during the conveying and/or pressurizing.

In some embodiments, for example after conveying and/or pressurizing, the slurry can be dispensed and/or extruded. The slurry can be dispensed and/or extruded using, for example, a "hanger die" sheet extrusion die, a "winter manifold" sheet extrusion die, a profile-style sheet extrusion die, an arbitrary nozzle operable to apply a continuous stream of material to a substrate, injection into a mold of the correct size and shape (e.g., filling a pocket with material), and/or any other suitable dispensing device.

In some embodiments, after dispensing the slurry can be formed into a final electrode. For example, the slurry can be calendar roll formed, stamped and/or pressed, subjected to vibrational settling, and/or cut in discrete sections. Additionally, in some embodiments, unwanted portions of material can be removed (e.g., masking and cleaning) and optionally recycled back into the slurry manufacturing process.

The systems, mixing equipment, processes and methods described herein can be used to produce a semi-solid suspension (e.g., slurry) suitable for use in electrochemical devices (e.g., batteries). The semi-solid suspension produced by such systems and methods are suitable for the formulation of a slurry-based electrodes with particular properties, for example, rheology, conductivity, and electrochemical performance. For example, some suitable mixing devices include batch mixers (e.g., C.W. Brabender or Banburry® style), continuous compounding devices such as ported single or twin screw extruders (e.g., Leistritz, Haake), high shear mixers such as blade-style blenders, high speed kneading machines, and/or rotary impellers. In some embodiments, the mixing device can be operable to control the flowability of the slurry by regulating the temperature, and/or to control the slurry homogeneity by modulating the chemical composition.

In embodiments in which a batch mixer is used to mix the slurry, the slurry can be transferred from the batch mixer to another piece of processing equipment, e.g., an extruder. In such embodiments, the transfer method can be chosen so as to minimize electrolyte losses, to not appreciably disrupt the slurry state, and/or to not introduce other processing difficulties, such as entrainment of ambient gases. In embodiments in which an extruder (e.g., twin screw) is used to mix the slurry, mixing and material conveyance occur together, thus eliminating a process step.

In some embodiments, some electrolyte loss can be tolerated and used as a control specification, and the amount that can be tolerated generally decreases as electrolyte volume fraction increases and/or mixing index increases. For example, at a mixing index of 0.8, the maximum electrolyte loss can be controlled to less than about 39%, to less than about 33%, or to less than about 27%. At a mixing index of 0.9, the maximum electrolyte loss can be controlled to less than about 5%, to less than about 4%, or to less than about 3%. At mixing indices higher than 0.9, the maximum electrolyte loss can be controlled to less than about 5%, to less than about 4%, or to less than about 3%. Component concentrations can be calculated to determine and/or predict tolerable losses, and vary according to the specific components. In other embodiments, loss tolerances will be higher while in others they will be more restrictive.

In some embodiments, the composition of the slurry and the mixing process can be selected to homogeneously disperse the components of the slurry, achieve a percolating conductive network throughout the slurry and sufficiently high bulk electrical conductivity, which correlates to desirable electrochemical performance as described in further detail herein, to obtain a rheological state conducive to processing, which may include transfer, conveyance (e.g., extrusion), dispensing, segmenting or cutting, and post-dispense forming (e.g., press forming, rolling, calendering, etc.), or any combination thereof.

The apparatus, systems, and methods described below are examples of semi-solid electrode cells having a porous current collector and examples of methods for manufacturing the electrode cells, according to specific embodiments. While specific embodiments are discussed, it should be understood that more than one embodiment can be integrated to compose, for example, a hybrid embodiment. The systems and methods described below can be applied to half cells (e.g., an anode cell or a cathode cell), full cells (e.g., and anode cell and a cathode cell separated by an ion permeable membrane), or modules (e.g., multiple full cells). Any of the semi-solids (or portions thereof) described above can be used in any of the embodiments described below. Similarly, any of the methods of mixing described above can be used in conjunction with any of the embodiments described below.

Figure 1B:
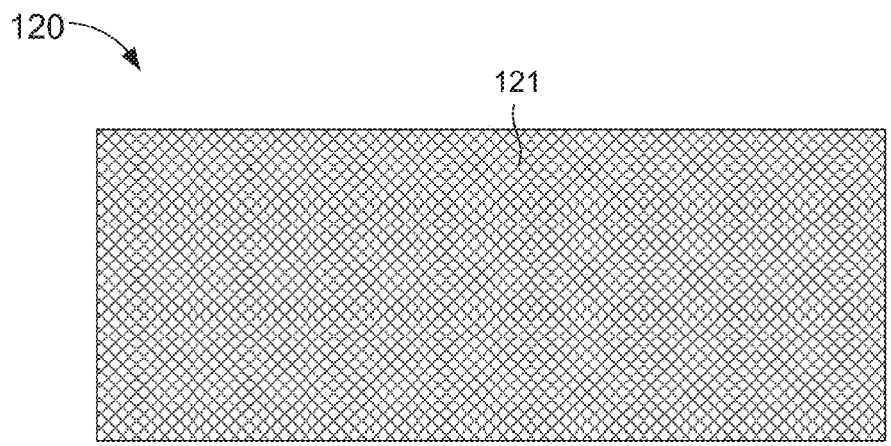
Figure 1C:
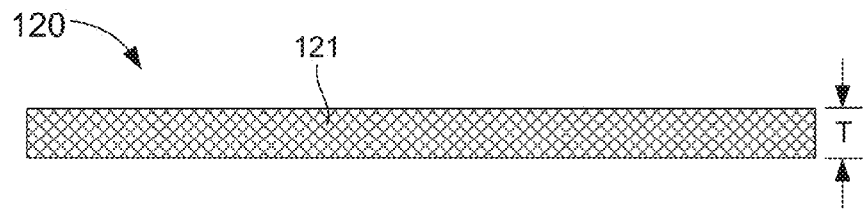

FIGS. 1A-1C are illustrations of a porous current collector 120 (also referred to herein as "collector") used in an electrochemical cell, according to an embodiment. In some embodiments, the collector 120 can be formed from a wire mesh, as shown in FIG. 1A. The wire mesh (also referred to herein as mesh) can include any number of filament wires 121 that can be assembled in various configurations using suitable processes, such as a regular pattern or structure produced by weaving, braiding, knitting, etc. or a more random pattern or structure produced by randomly distributing wires 121 and joining them by welding, adhesives, or other suitable techniques. Moreover, the wires 121 comprising the mesh can be any suitable material. For example, in some embodiments, the wires are metallic such as, steel, aluminum, copper, titanium or any other suitable metal. In other embodiments, the wires can be a conductive non-metallic material such as, for example, carbon nanofiber or any other suitable material. In some embodiments, the wires 121 can include coatings. For example, the coatings can be configured to reduce corrosion and enhance or reduce adhesion characteristics (e.g., hydrophilic or hydrophobic coatings, respectively).

The openings 122 defined by the mesh can be any suitable shape. For example, in some embodiments, the openings 122 are polygonal (e.g., square, rectangular, pentagonal, hexagonal, etc.). In some embodiments, a woven mesh can include a selvage configured to prevent fraying. Similarly stated, the woven mesh can include an outer edge (i.e., selvage) configured to prevent the mesh weave from loosening, fraying, separating, and/or otherwise failing at the edges.

In some embodiments, the porous current collector 120 can be an electronically conductive (e.g., metallic) open-cell foam (e.g., a cellular structure consisting of solid metal containing relatively large volume fraction of gas-filled pores). The open cells (e.g., voids) form interconnected network that allows the semi-solid suspension to flow through the foam and substantially fill the voids such that the "gas-filled pores" become filled with the semi-solid suspension during the electrode manufacturing process. The porosity of the foam can be modified by changing the size (e.g., volume) of the gas-filled pores and/or density of the cellular structure. For example, the "struts" between the "vertices" of the cellular structure can be lengthened to create larger pores, thereby increasing the porosity of the foam. Alternatively, the "thickness" or "diameter" of the struts can be reduced to increase the size of the pores.

In some embodiments, the porous current collector 120 can be an electronically conductive "mesh" having a regular pattern or structure produced by weaving, braiding, knitting, etc. or a more random pattern or structure produced by randomly distributing wires 121 and joining them by welding, adhesives, or other suitable techniques. Similar to foam described above, the mesh has an interconnected network of voids that allows the semi-solid suspension to flow through the mesh and substantially fill the voids. The porosity of the mesh can be modified in any of a variety of ways including, for example, changing the thickness or diameter of the individual wires 121, changing the distance between adjacent wires 121, changing the angle at which individual wires intersect (e.g., braiding angle), or changing the number or wires in the pattern.

Regardless of whether the porous current collector 120 is a "form," a "mesh", or any other porous structure defined herein, the porosity can be defined as the volume fraction of voids (e.g., gas-filled, liquid filled, or semi-solid filled) divided by the total volume of the porous current collector 120 (e.g., sum of the volume fraction of the voids and the volume fraction of solid materials (e.g., cellular structure or wires). Therefore, the porosity can be modified to optimize the electronic conductivity, the resistance, structural performance, and/or any other electrical and physical characteristic. For example, in some embodiments, the collector 120 can have a porosity of at least 66%. In some embodiments, the collector 120 can have a porosity of at least 80%. In some embodiments, the collector 120 can have a porosity of at least 90%.

In some embodiments, the porous current collector 120 can include a plurality of similar or dissimilar porous substrates. For example, the porous current collector 120 can include a stack of porous substrates of different sizes and/or porosity. In some embodiments, a porous substrate or stack of porous substrates can be disposed on, or mechanically coupled to (e.g., soldered, brazed, welded) a solid metal foil. Said another way, porous current collector 120 does not necessarily have uniform porosity characteristics (e.g., functional gradient architecture is possible).

The porous collector 120 can be any suitable shape or size. For example, as shown in FIG. 1B, the collector 120 can be substantially rectangular. In other embodiments, the size and shape of the collector 120 can substantially correspond to a shape and size of an electrochemical cell cavity (e.g., in an anode cell and/or a cathode cell, as further described herein). For example, in some embodiments, the collector 120 can be polygonal (e.g., square, pentagonal, hexagonal, etc.) or oval (e.g., circular, elliptical, oblong, etc.). As shown in FIG. 1C, the collector 120 has thickness T that can be any suitable size. For example, in some embodiments, the thickness T can substantially correspond to a depth of an electrochemical cell cavity. In some embodiments, the collector 120 can be sufficiently thick such that a desired electrical conductivity is achieved, as described below. In some embodiments, the collector 120 can be folded upon itself to increase the thickness T. In some embodiments, the current collector 120 can have a thickness T in a range of about 50 microns to about 5,000 microns. In some embodiments, the collector 120 can have a thickness T in a range of about 100 microns to about 3,000 microns. In some embodiments, the collector 120 can have a thickness T in a range about 200 microns to about 2,500 microns. In some embodiments, a portion of the collector can be folded and compressed to form an integral electrode lead.

While the collector 120 is described above as being a wire mesh, in other embodiments, the collector 120 can be any suitable porous substrate. For example, in some embodiments, collector 120 can be an expanded metal framework, a reticulated material, a non-metallic, conductive mesh, a perforated metal, an engineered micro-truss, conductive foam, or the like. In some embodiments, the mesh size, wire diameter, opening size, or any other substrate characteristic of the collector 120 can be configured to produce optimal electrical performance. For example, increasing the diameter of the wires 121 can increase the thickness of the collector 120 and allow for better electrical conductivity when placed in contact with an electrode material. In some embodiments, the openings 122 defined by the collector 120 (either a wire mesh or other porous substrate) can be sufficiently large to not adversely affect the suspension of an electrode material (e.g., such that would produce a non-uniform suspension).

Figure 2:
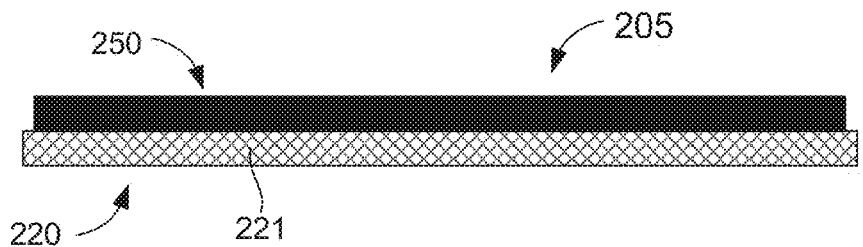
FIGS. 2-6 are schematic illustrations of electrodes disposed on porous current collectors, according to specific embodiments.
Figure 3:
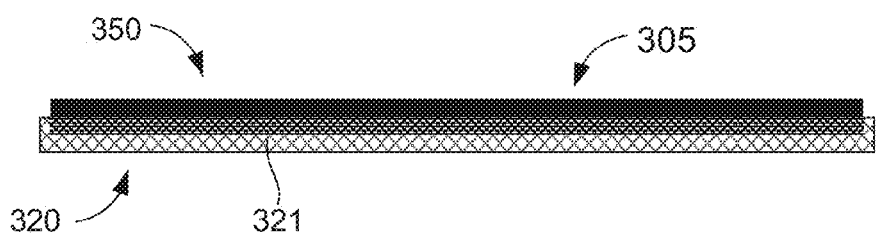

In use, a current collector can be placed in contact with an electrode material (e.g., a semi-solid anode slurry or a semi-solid cathode slurry) and the current collector and electrode material can collectively be disposed within an electrochemical cell cavity. For example, as shown in FIG. 2, an electrode 205 is formed by an electrode material 250 that is disposed on a porous current collector 220. The current collector 220 can define a framework 221 that is configured to support the electrode material 250 such that the electrode material 250 and the collector 220 are in electrical communication. In other embodiments, such as shown in FIG. 3, an electrode 305 is formed by at least partially embedding an electrode material 350 (e.g., a semi-solid electrode material) in a porous current collector 320. The current collector 320 can define a framework 321 that supports the electrode material 350 while allowing a portion of the electrode material 350 to occupy any voids within the framework 321 of the current collector 320. The electrode material 350 that is disposed within the voids defined by the framework 321 can increase the electrical conductivity therebetween and the framework 321 can act as a scaffold for at least a portion of the electrode material 350.

In some embodiments, the charge capacity of an electrochemical cell can correspond to the thickness of the electrode material. Expanding further, the charge capacity of a battery corresponds to both the thickness of the electrode material and the number of electrochemical cells disposed within a battery container. Therefore, while the embodiments shown in FIGS. 2 and 3 are examples of single sided electrodes (e.g., electrode material disposed on only one side of the current collector), the charge capacity of an electrochemical cell and thus, a battery (not shown in FIG. 2 or 3) utilizing such embodiments, can be limited by the thickness of a portion of the current collector (e.g., the current collector 220 and/or 320) not in contact with the electrode material (e.g., the electrode material 250 and/or 350). Said another way, since a current collector (or some other conductive element) is an inactive component of an electrochemical cell, minimizing the volume fraction of the current collector and maximizing the volume fraction of the active electrode material improves the overall energy density of the electrochemical cell.

Figure 4:
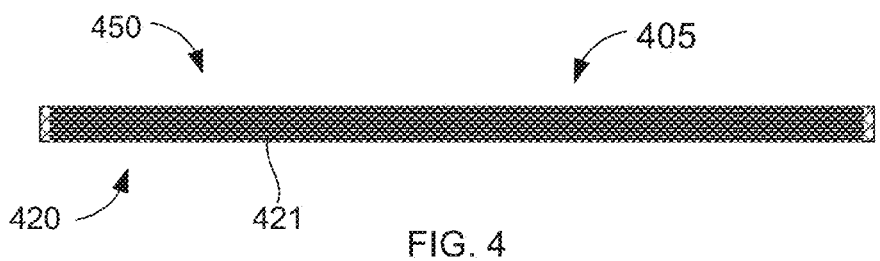

FIG. 4 is a schematic illustration of an electrode 405 according to an embodiment. The electrode 405 includes an electrode material 450 that substantially encapsulates a porous current collector 420. The electrode material 450 can be, for example, any of the semi-solid electrode materials described herein (e.g., a semi-solid anode or a semi-solid cathode). The porous current collector 420 includes a framework 421 that is substantially similar to those described above with reference to FIGS. 1A-1C. In some embodiments, the electrode material 450 can be placed under pressure such that the electrode material 450 is urged to flow through any pores (e.g., voids, openings, spaces, apertures, or the like) defined by the porous current collector 420. In other embodiments, the porous current collector 420 can be disposed within a bath of the electrode material 450 such that the electrode material 450 flows through the pores of the porous current collector 420 (e.g., via wicking) and substantially encapsulates the collector 420.

In some embodiments, the electrode material 450 can flow into the pores of the porous current collector 420 at a substantially ambient temperature. In other embodiments, the electrode material 450 can be heated to facilitate the flowing of the electrode material 450 into the pores of the porous current collector 420. In some embodiments, once the electrode material 450 has substantially encapsulated the porous current collector 420, the temperature can be reduced (e.g., to or below the freezing point of the electrode material 450) such that the electrode material 450 can set (e.g., stiffen or harden).

In this manner, the electrical conductivity between the electrode material 450 and the current collector 420 can be increased by increasing the surface area of the electrode material 450 that is in contact with the current collector 420. Furthermore, the charge capacity relative to electrode thickness can be increased as the electrode material 450 substantially encapsulates the porous current collector 420. As shown in FIG. 4, the end portions of the current collector 420 can be substantially not encapsulated. In this manner, the current collector 420 can be coupled to or include a tab configured to be an electrical lead that is substantially not encapsulated by the electrode material 450. Alternatively, only one end portion of the current collector 420 can be substantially not encapsulated (not shown). Therefore, when the electrode 405 is disposed within an electrochemical cell cavity and a separator (an ion permeable membrane) is disposed about the electrode 405 the tab can extend from the cavity to form an electrical lead for the electrochemical cell.

Figure 5:
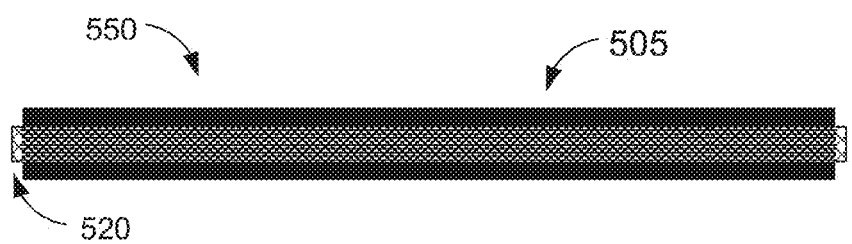

While the electrode 405 is shown in FIG. 4 as including the electrode material 450 that has a substantially similar thickness as the porous current collector 420, in other embodiments, the thicknesses need not be similar. For example, FIG. 5 is a schematic illustration of an electrode 505, according to an embodiment. The electrode 505 includes an electrode material 550 that substantially encapsulates a porous current collector 520, as described above with reference to FIG. 4. As shown in FIG. 5, the electrode material 550 can have a thickness that is greater than a thickness of the porous current collector 520.

Figure 6:
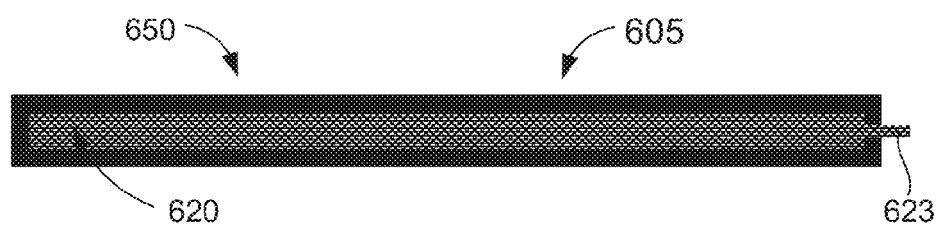

While the electrode 505 is shown in FIG. 5 as including a porous current collector 520 that includes end portions that are substantially not encapsulated, in other embodiments, an electrode material can be configured to substantially encapsulate end portions of a current collector. For example, FIG. 6 is a schematic illustration of an electrode 605, according to an embodiment. The electrode 605 includes an electrode material 650 that substantially encapsulates a porous current collector 620. More specifically, the electrode material 650 substantially encapsulates both end portions of the porous current collector 620. As shown in FIG. 6, the porous current collector 620 includes a tab 623 configured to extend from an end portion of the porous current collector 620 such that the tab 623 is substantially not encapsulated. In this manner, the tab 623 can be configured to form an electrical lead.

As described herein, in some embodiments, the current collector 120, 220, 320, 420, 520, 620 can have a thickness T in a range of about 50 microns to about 5,000 microns, in a range of about 100 microns to about 3,000 microns or in a range about 200 microns to about 2,500 microns. In some embodiments, the finished electrodes 205, 305, 405, 505, 605 can have a thickness that is substantially equal to the thickness T of the current collector 120, 220, 320, 420, 520, 620. In some embodiments, the finished electrodes 205, 305, 405, 505, 605 can have a thickness that is greater than the thickness T of the current collector 120, 220, 320, 420, 520, 620. For example, as shown in FIGS. 5 and 6, the electrode material 550, 650 extends beyond the thickness of the current collector 520, 620 so that the thickness of the finished electrode 505, 605 is greater than the current collector 520, 620. In some embodiments, the thickness of the current collector is greater than about 20%, 25%, 30%, 35%, 40%, 50%, 55%, 60%, 65%, 70%, 75%, 80%, 85%, 90%, or 95% of the thickness of the finished electrode. In some embodiments, the thickness of the current collector is substantially equal to the thickness of the finished electrode. Said another way, when the thickness of the finished electrode is substantially equal to or greater than the thickness of the current collector, the finished electrode can be said the be a "double-sided" electrode.

Figure 7A:
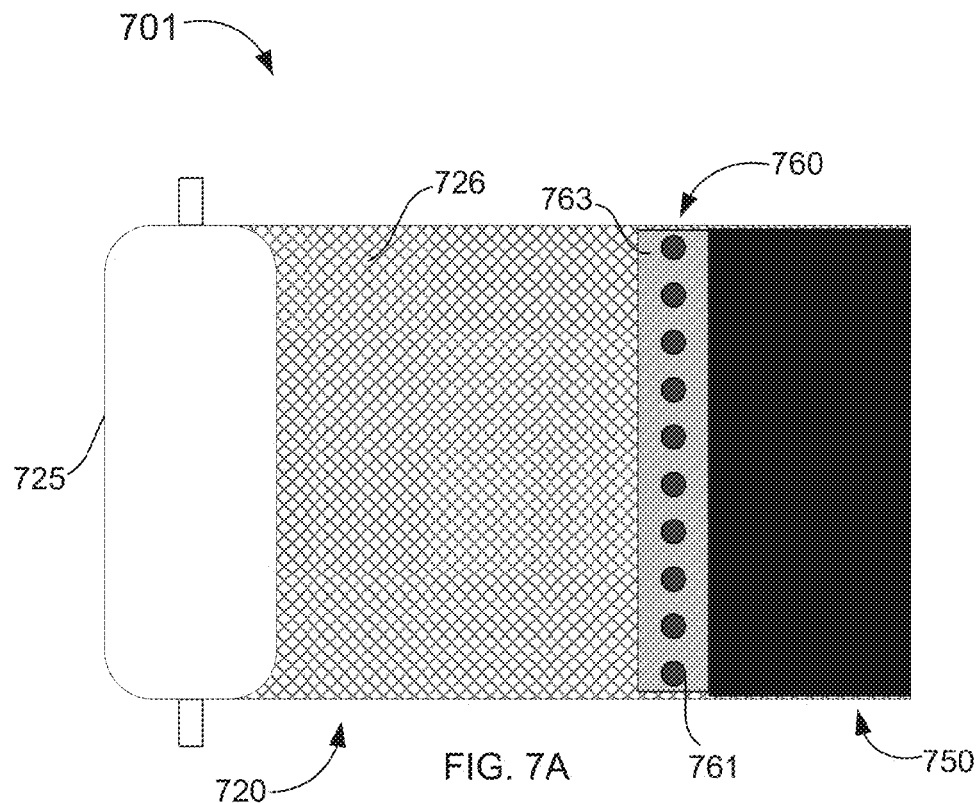
FIGS. 7A and 7B illustrate a system for depositing a semi-solid electrode material on or at least partially within a porous current collector, according to an embodiment.
Figure 7B:
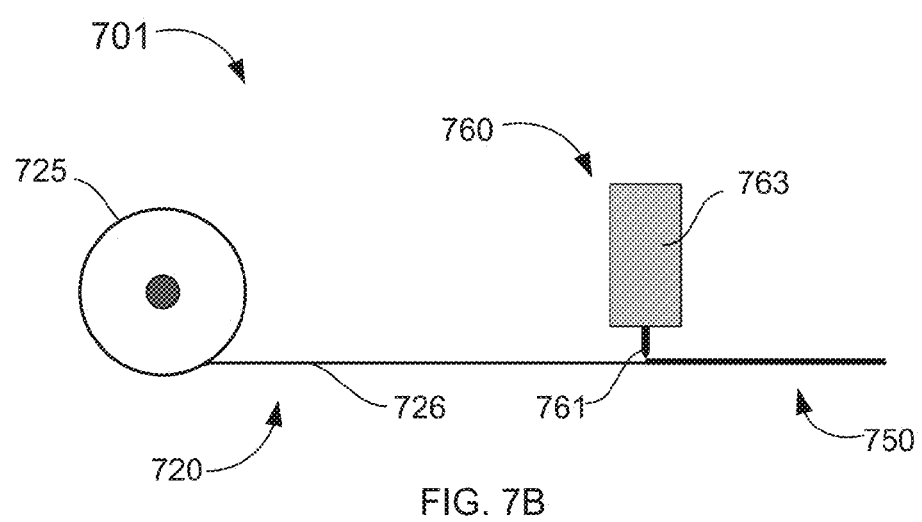

Referring now to FIGS. 7A and 7B, a system 701 for manufacturing an electrode is illustrated, according to an embodiment. The system 701 includes a porous current collector 720, a semi-solid electrode material 750 (also referred to herein as "electrode material"), and a dispensing device 760. The semi-solid electrode material 750 can be any of those described in detail herein. The porous current collector 720 (also referred to herein as "collector") can be, for example, a sheet of any porous material described herein stored in a roll 725. The collector 720 can be unrolled from the roll 725 in a manual or automated process such that a planar portion 726 of the collector 720 extends from the roll 725. For example, a mechanical clamp (not shown) can clamp an end of the collector 720 and pull the collector 720 in a direction such that the roll 725 unrolls. In some embodiments, the collector 720 can travel on a conveyer system.

The dispensing device 760 includes a reservoir 763 and a plurality of nozzles 761. The reservoir 763 is configured to contain a portion of the electrode material 750. In this manner, a portion of the electrode material 750 can flow through the nozzles 761 in response to an applied pressure. In some embodiments, the applied pressure can be a gravitational field exerted on the electrode material 750. In other embodiments, the applied pressure can be supplied by any suitable pump or the like. In some embodiments, the nozzles 761 can dispense a portion of the electrode material 750 with sufficient force such that the electrode material 750 substantially fills the pores (e.g., voids, openings, spaces, apertures, or the like) of the collector 720. In this manner, the electrode material 750 can substantially encapsulate the collector 720. In some embodiments, the system 701 can include any suitable device configured to facilitate the flow of the electrode material 750 (e.g., devices for applying agitation, vibration, sonication, or the like).

While not shown in FIGS. 7A and 7B, the system 701 can include any suitable device configured to perform post-processing steps on the formed electrode. For example, in some embodiments, the system 701 can include a device configured to substantially cool the formed electrode. In such embodiments, the device can cool the formed electrode to or below the freezing point of the electrode material 750 such that the electrode material sets or hardens. In some embodiments, the system 701 can include a device configured to slit the formed electrodes (e.g., the collector 720 encapsulated by the electrode material 750) to any suitable size such that the formed electrodes can be disposed in an electrochemical cell. In some embodiments, the system 701 can include any other suitable post processing steps such as, for example, calendering. In some embodiments, the system 701 can include a device (not shown) for coupling a tab (e.g., an electrical lead) to the electrode. For example, in some embodiments, a tab can be welded, crimped, or otherwise fixedly and electronically coupled to the electrode. In some embodiments, the system 701 can include a second dispensing device (not shown) configured to dispense the electrode material 750 on the opposite side of the current collector 720 and substantially encapsulate the current collector 720.

Referring now to FIGS. 8A and 8B, a system 801 for manufacturing an electrode is illustrated, according to an embodiment. The system 801 includes a porous current collector 820, a semi-solid electrode material 850 (also referred to herein as "electrode material"), a dispensing device 860, and a roller 870. The semi-solid electrode material 850 can be any of those described in detail herein. The porous current collector 820 (also referred to herein as "collector") can be, for example, a sheet of any porous material described herein stored in a roll 825. The collector 820 can be unrolled from the roll 825 in a manual or automated process such that a planar portion 826 of the collector 820 extends from the roll 825 (as described above with reference to FIGS. 7A and 7B).

The dispensing device 860 includes a reservoir 863 defining a dispensing slot 862. The reservoir 863 is configured to contain a portion of the electrode material 850. In this manner, a portion of the electrode material 850 can flow through the slot 862 in response to an applied pressure (as described above with reference to FIGS. 7A and 7B). In some embodiments, the system 801 can include any suitable device configured to facilitate the flow of the electrode material 850 (e.g., devices for applying agitation, vibration, sonication, or the like). In this manner, the electrode material 850 can be deposited on the collector 820. As shown in FIG. 8B, the roller 870 can be configured to engage the electrode material 850 and the collector 820 to apply a compressive force such that the electrode material 850 fills the pores of the collector 820 and substantially encapsulates the collector 820. While not shown in FIGS. 8A and 8B, the system 801 can include any of the post-processing steps included in the system 701 described with reference to FIGS. 7A and 7B including a second dispensing device.

Figure 9A:
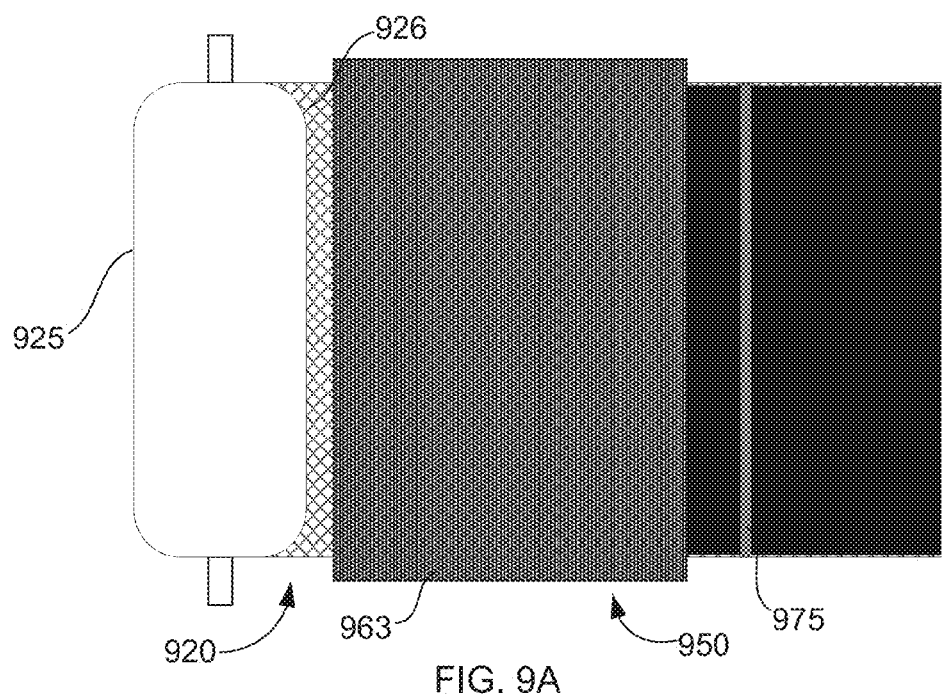
FIGS. 9A and 9B illustrate a system for depositing a semi-solid electrode material on or at least partially within a porous current collector, according to an embodiment.
Figure 9B:
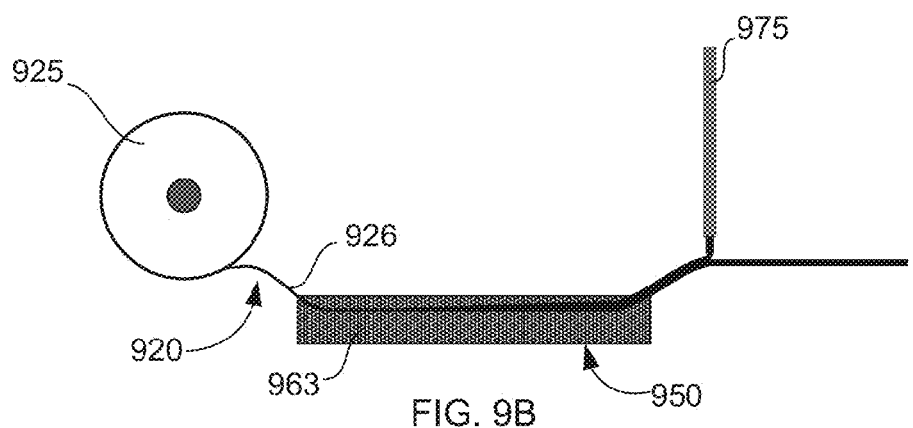

Referring now to FIGS. 9A and 9B, a system 901 for manufacturing an electrode is illustrated, according to an embodiment. The system 901 includes a porous current collector 920, a semi-solid electrode material 950 (also referred to herein as "electrode material"), a reservoir 963, and a control device 975. The semi-solid electrode material 950 can be any of those described in detail herein and is disposed within the reservoir 963. The porous current collector 920 (also referred to herein as "collector") can be, for example, a sheet of any porous material described herein stored in a roll 925. The collector 920 can be unrolled from the roll 925 in a manual or automated process such that a portion 926 of the collector 920 extends from the roll 925. More specifically, the portion of the collector 920 is passed through the reservoir 963 such that the portion 926 of the collector 920 is disposed in the electrode material 950. In this manner, the electrode material 950 can substantially encapsulate and impregnate the collector 920. While not shown in FIGS. 9A and 9B, the system 901 can include any suitable device configured to facilitate the encapsulation of the collector 920 (e.g., any of those described above).

As shown in FIG. 9B, the system 901 can include a control device 975 configured to remove excess material from the collector 920. For example, the collector 920 can be passed through the reservoir 963 such that the electrode material 950 substantially encapsulates the collector 920 and a doctor blade (e.g., the control device 975) can engage the electrode material 950 and/or the collector 920 to remove excess electrode material 950 from the collector 920. While not shown in FIGS. 9A and 9B, the system 901 can include any of the post-processing steps included in the system 701 described with reference to FIGS. 7A and 7B.

Figure 10A:
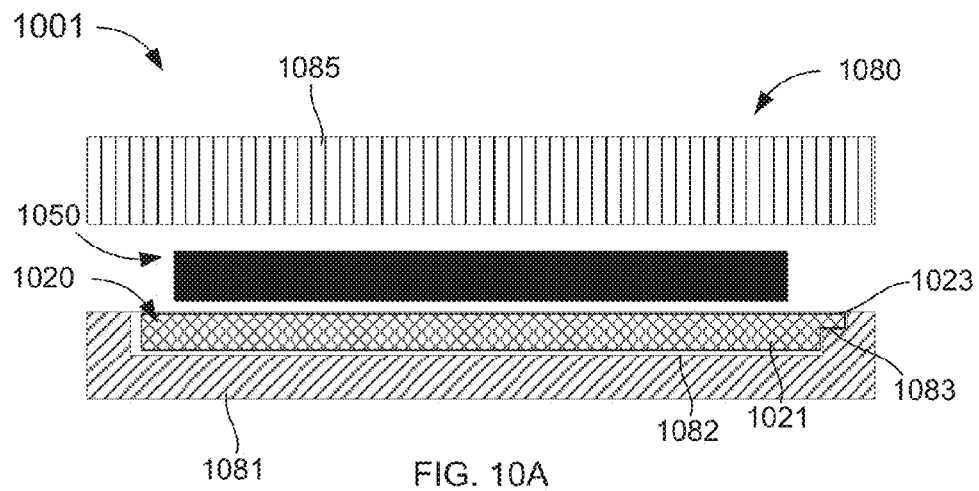
FIGS. 10A-10C illustrate a method of manufacturing an electrode having a porous current collector, according to an embodiment.
Figure 10B:
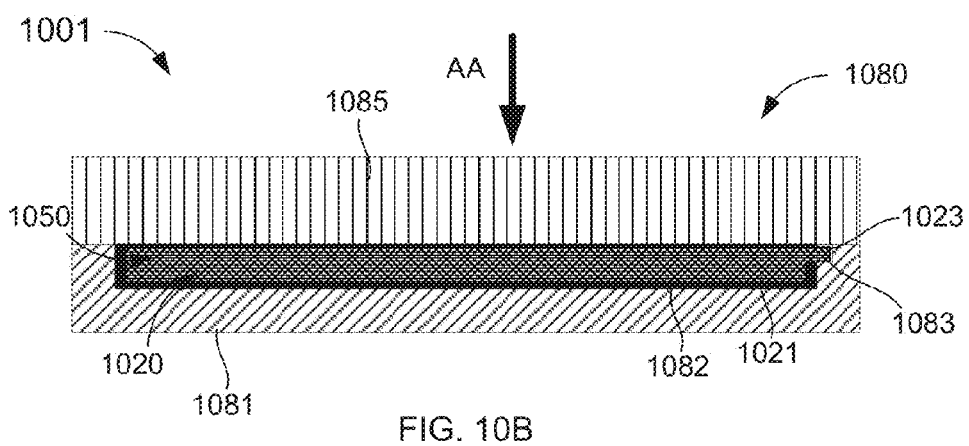
Figure 10C:
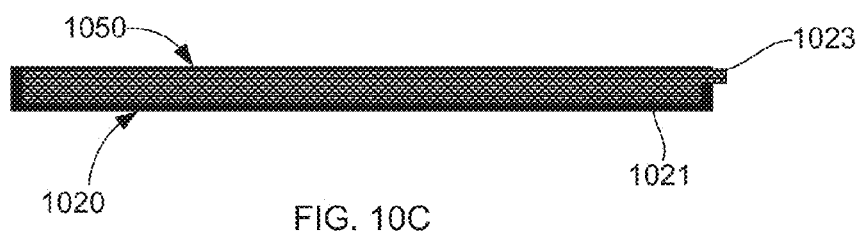

FIGS. 10A-10C are schematic illustrations of a system 1001 for manufacturing an electrode, according to an embodiment. The system 1001 includes a porous current collector 1020, a semi-solid electrode material 1050 (also referred to herein as "electrode material"), and a mold 1080. The mold 1080 includes a first plate 1081 and a second plate 1085. The first plate 1081 defines a recessed portion 1082 and a notch 1083, each configured to receive a portion of the porous current collector 1020. While the recess 1082 is shown in FIGS. 10A and 10B as being substantially rectangular, the first plate 1081 can define a recessed portion having any suitable shape. For example, in some embodiments, the recessed portion 1082 can be substantially concave, convex, triangular, pyramidal, or any other suitable shape. The second plate 1085 is a substantially planar plate and can be configured to move relative to the first plate 1081, as further described herein.

The porous current collector 1020 can be any of the porous current collectors described herein. In this manner, the porous current collector 1020 includes a framework 1021 that can act as a scaffold for at least a portion of the electrode material 1050, as further described herein. The porous current collector 1020 also includes a tab 1023 configured to be disposed within the notch 1083 of the first plate 1081. As shown in FIG. 10A, the porous current collector 1020 can be disposed within the recess 1082 and the notch 1083 of the first plate 1081 and be configured to receive at least portion of the electrode material 1050, as further described herein.

The electrode material 1050 can be substantially similar to any of the electrode materials described herein. Furthermore, the electrode material 1050 can include anode active material (i.e., the electrode material 1050 is anode material) or cathode active material (i.e., the electrode material is cathode material). As shown in FIG. 10A, a desired amount of electrode material 1050 is configured to be disposed between the porous current collector 1020 and the second plate 1085. In some embodiments, the electrode material 1050 can be actively transferred to the mold 1080 (e.g., the void between the second plate 1085 and the porous current collector 1020). In other embodiments, the electrode material 1050 can be extruded such that the electrode material 1050 defines a desired shape and can be fed into the mold 1080 (e.g., either continuously or modularly). In other embodiments, the electrode material 1050 can be disposed within, for example, a collapsible container and can be modularly delivered to the mold 1080.

With the desired amount of the electrode material 1050 disposed between the second plate 1085 and the porous current collector 1020, the second plate 1085 can be moved relative to the first plate 1081, as indicated by the arrow AA in FIG. 10B. In this manner, the second plate 1085 exerts a force on the electrode material 1050 to move the electrode material 1050 relative to the porous current collector 1020. The pressure exerted on the electrode material 1050 is such that the electrode material 1050 flows within the pores (e.g., voids, openings, spaces, etc.) defined by the framework 1021 of the porous current collector 1020. Therefore, the electrode material 1050 substantially encapsulates the porous current collector 1020, as shown in FIGS. 10B and 10C. The tab 1023, being disposed within notch 1083, can remain substantially not encapsulated by the electrode material 1050 and can thus, act as an electrical lead for an electrochemical cell in which the formed electrode is disposed.

While the electrode material 1050 is shown in FIGS. 10A and 10B as being moved relative to the porous current collector 1020, in some embodiments, the electrode material 1050 can be disposed within the recess 1082 of the lower plate 1081 and the collector 1020 can be moved relative to the electrode material 1050. Similarly stated, the upper plate 1085 can be placed in contact with the collector 1020 to move the collector 1020 relative to the electrode material 1050.

In some embodiments, the system 1001 can include a device(s) configured to facilitate the flow of the electrode material 1050. For example, in some embodiments, the system 1001 can include a device configured to apply vibration, sonication, or agitation to the first plate 1081, the second plate 1085, the porous current collector 1020, and/or the electrode material 1050. In some embodiments, the electrode material 1050 can be heated to facilitate the flow. In such embodiments, the system 1001 can include a device configured to supply heat to the first plate 1081, the second plate 1085, the porous current collector 1020, and/or the electrode material 1050.

In some embodiments, the system 1001 can include a device configured to reduce the temperature of the electrode material 1050 (e.g., to or below the freezing point). For example, with the electrode material 1050 substantially encapsulating the porous current collector 1020, in some embodiments, the temperature of the electrode material 1050 can be reduced such that the electrode material 1050 sets (e.g., hardens around the porous current collector 1020). In some embodiments, the first plate 1081 can be cooled so that when the electrode material 1050 is forced into contact with the first plate 1081 by movement of the second plate 1085, heat energy is transferred away from the electrode material 1050, thereby reducing the temperature of the electrode material 1050 below the freezing point to facilitate handling of the formed electrode material 1050. The frozen electrode material 1050 can then be manually (e.g., by hand) or mechanically (e.g., via conveyer, robotic arm, etc.) used to manufacture an electrochemical cell. The electrode material 1050 can then be returned back to ambient temperature prior to use.

While described above as associating the porous current collector 1020 with the electrode material prior to the "freezing" of the electrode material, in some embodiments, the electrode material 1050 can be formed using any suitable methods that can include substantially cooling the electrode material 1050 (e.g., to or below the freezing point) to facilitate the handling of the formed electrode material 1050. For example, a desired amount of liquid or semi-solid electrode material 1050 can be disposed in a mold (e.g., the recess 1082 between the first plate 1081 and the second plate 1085). Heat energy can then be transferred away from the electrode material 1050, thereby reducing the temperature of the electrode material 1050 below the freezing point to solidify the electrode material 1050. The solid electrode material 1050 can then be manually (e.g., by hand) or mechanically (e.g., via conveyer, robotic arm, etc.) disposed on a current collector (porous or conventional foil) and then assembled into an electrochemical cell. The electrode material 1050 can then be returned back to ambient temperature prior to use.

Figure 11E:
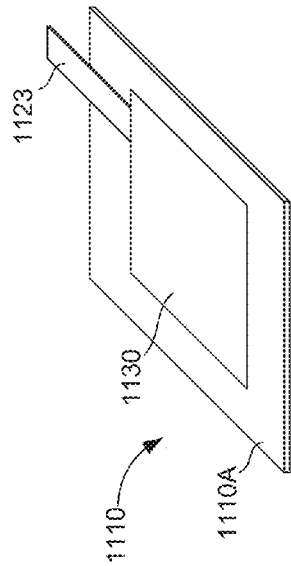

FIGS. 11A-11G are schematic illustrations of a method 1102 showing a system for manufacturing an electrochemical cell, according to an embodiment. The system includes a substrate 1110A (e.g., configured to form an electrode cell once manufactured), a porous current collector 1120, a semi-solid electrode material 1150 (also referred to herein as "electrode material"), and a mold 1180. As shown in FIG. 11A, the mold 1180 includes a first plate 1181 and a second plate 1185. The first plate 1181 defines a recessed portion 1182 configured to receive a portion of the substrate 1110A, the porous current collector 1120, and the electrode material 1150, as further described herein. While the recess 1182 is shown in FIG. 11A as being substantially rectangular, the first plate 1181 can define a recessed portion having any suitable shape. For example, in some embodiments, the recessed portion can be substantially concave, convex, triangular, pyramidal, or any other suitable shape. The second plate 1185 is a substantially planar plate and can be configured to move relative to the first plate 1181, as further described herein.

The substrate 1110A can be any suitable cell material. For example, in some embodiments, the substrate 1110A is a laminated substrate (similar in composition to known laminated substrates). In some embodiments, the substrate 1110A is substantially planar and can be moldable (e.g., can plastic deform in response to an applied force) (see e.g., FIG. 11B). In some embodiments, the substrate 1110A can define a cavity or recess (not shown) prior to manufacturing that can receive a portion of the porous current collector 1120 and the electrode material 1150, as further described herein.

The electrode material 1150 can be substantially similar to any of the electrode materials described herein. Furthermore, the electrode material 1150 can include anode active material (i.e., the electrode material 1150 is anode material) or cathode active material (i.e., the electrode material is cathode material). The porous current collector 1120 can be any of the porous current collectors described herein. In this manner, the porous current collector 1120 includes a framework (not shown in FIGS. 11A-11G) that can act as a scaffold for at least a portion of the electrode material 1150, as further described herein. The porous current collector 1120 also includes a tab 1123 configured to extend beyond the substrate and to act as an electrical lead, as further described herein.

As shown in FIG. 11C, the porous current collector 1120 can be disposed on the substrate 1110A and a desired amount of electrode material 1150 can be disposed between the porous current collector 1120 and the second plate 1185. In some embodiments, the electrode material 1150 can be actively transferred to the mold 1180 (e.g., the void between the second plate 1185 and the porous current collector 1120). In other embodiments, the electrode material 1150 can be extruded such that the electrode material 1150 defines a desired shape and can be fed into the mold 1180 (e.g., either continuously or modularly). In other embodiments, the electrode material 1150 can be disposed within, for example, a collapsible container and can be modularly delivered to the mold 1180.

With the desired amount of the electrode material 1150 disposed between the second plate 1185 and the porous current collector 1120, the second plate 1185 can be moved relative to the first plate 1181, as indicated by the arrow BB in FIG. 11C. In this manner, the second plate 1185 exerts a force on the electrode material 1150 to move the electrode material 1150 relative to the porous current collector 1120. The pressure exerted on the electrode material 1150 is such that the electrode material 1150 flows within the pores (e.g., voids, openings, spaces, etc.) defined by the framework of the porous current collector 1120. Furthermore, a portion of the force is transferred to the substrate 1110A such that the substrate 1110A deforms to substantially fill the recess 1182 of the first plate 1081. In this manner, the substrate 1110A can deform to fill the recess 1182 thereby, defining a substrate cavity in which the porous current collector 1120 and the electrode material 1150 are disposed.

Figure 11G:
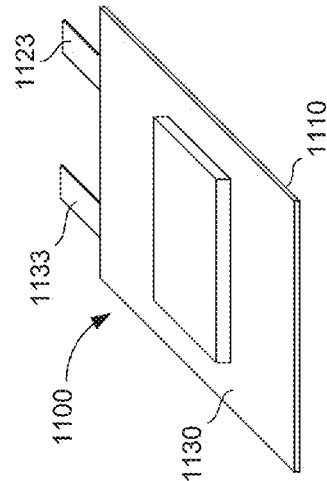
Figure 11D:
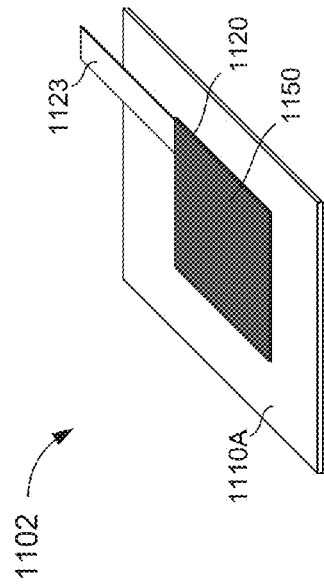

As shown in FIG. 11D, the electrode material 1150 can substantially encapsulate the porous current collector 1120 when the electrode material 1150 and the porous current collector 1120 are disposed within the cavity (not shown) defined by the substrate 1110A. The tab 1123 can be configured to extend from the cavity beyond an edge of the substrate 1110A and can remain substantially not encapsulated by the electrode material 1150. The system can also include any suitable device configured to facilitate the flow of the electrode material 1150 such as, for example, those described above.

Figure 11F:
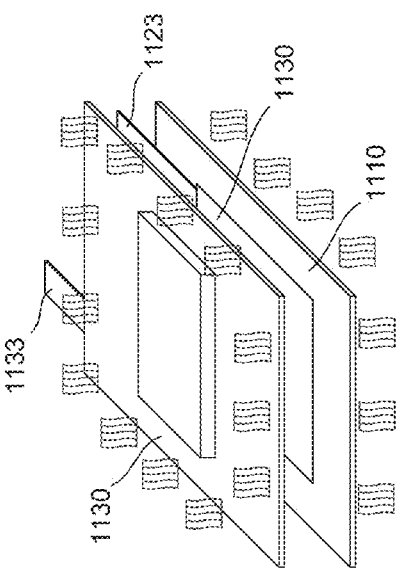

With the substrate 1110A defining the cavity (not shown) and with the current collector 1120 and the electrode material 1150 disposed therein, a separator 1190 (e.g., an ion permeable membrane) is disposed about the cavity to enclose the electrode material 1150 and the porous current collector 1120 (the separator does not enclose the tab 1123), thereby forming an electrode cell (see e.g., FIG. 11E). The electrode cell can be, for example, an anode cell 1110. The method 1101 further includes forming a second electrode cell, for example, a cathode cell 1130 in a similar manner as described. As shown in FIG. 11F, the cathode cell 1130 can be disposed adjacent to the anode cell 1110 and the system can include a device configured to apply heat to a portion of the anode cell 1110 and a portion of the cathode cell 1130.

In this manner, the substrate material (e.g., substrate 1110A) can be coupled together (e.g., via a chemical bond produced by the application of heat). Thus, the coupling of the anode cell 1110 and the cathode cell 1130 forms an electrochemical cell 1100 (e.g., a battery cell), as shown in FIG. 11G.

FIG. 12 is an illustration of at least a portion of an electrochemical cell 1200, according to an embodiment. The portion of the electrochemical cell 1200 include a set of anodes 1210 and a set of cathodes 1230 configured in an alternating arrangement and separated by a set of separators 1290, as further described below. The anodes 1210 and the cathodes 1230 can be substantially similar to any of those described herein. Expanding further, the anodes 1210 and the cathodes 1230 each include a porous current collector 1220 substantially encapsulated by an electrode material 1250 (e.g., an anode material and a cathode material, respectively). The portion of the electrochemical cell 1200 also includes a set of anode electrical leads and a set of cathode electrical leads, in physical and electrical contact with the anodes 1210 and the cathodes 1230, respectively. Furthermore, the individual anode leads can be physically and electronically coupled together (e.g., via ultrasonic welding) such that the individual anode leads form a single anode electrical lead 1223. Similarly, the individual cathode leads can be physically and electronically coupled to form a single cathode electrical lead 1233. In this manner, the anode lead 1223 and the cathode lead 1233 can be electronically connected to an anode terminal (not shown) and a cathode terminal (not shown) to form, for example, a battery.

The separators 1290 can be, for example, ion permeable membranes. As shown in FIG. 12, the separators 1290 are each configured to extend substantially beyond a surface of the anodes 1210 and cathodes 1230, thereby reducing the likelihood of electrical short circuiting from an anode 1210 contacting a cathode 1230. While the separators 1290 are shown in FIG. 12 as individually disposed between a pair of an adjacent anode and cathode, in other embodiments, a separator can be substantially continuous such that a single separator separates each anode and cathode pair. In other embodiments, one or more of the anodes 1210 and/or one or more of the cathodes 1230 can be disposed within, for example, a separator bag (not shown). Similarly stated, a single separator can substantially encapsulate an anode or a cathode. In such embodiments, the separator bag can define an opening or port configured to receive an anode lead or a cathode lead, accordingly.

While the current collectors 1220 are shown in FIG. 12 as being encapsulated by the electrode material 1250 and coupled to electrical leads 1223 and 1233, in some embodiments, a battery can include current collectors with an integrated electrical lead that is substantially not encapsulated by electrode material. For example, FIG. 13 is an illustration of at least a portion of an electrochemical cell 1300, according to an embodiment. The portion of the electrochemical cell 1300 includes a set of anodes 1310 and a set of cathodes 1330 configured in an alternating arrangement and separated by a separator 1390 (e.g., ion permeable membranes). As shown in FIG. 13, the separator 1390 can be substantially continuous such that a single separator separates each adjacent anode 1310 and cathode 1330 pair. In other embodiments, the separator 1390 can be any suitable configuration such as, for example, those described above with reference to FIG. 12.

The anodes 1310 and the cathodes 1330 can be substantially similar to any of those described herein. Expanding further, the anodes 1310 and the cathodes 1330 each include a porous current collector 1320 substantially encapsulated by an electrode material 1350 (e.g., an anode material and a cathode material, respectively). The anode cells 1310 and the cathode cells 1330 can further be configured to include integrated electrical leads 1323 and 1333, respectively. The anode electrical leads 1323 and the cathode electrical leads 1333 can be, for example, portions of the current collectors 1320 configured to extend beyond the electrode material 1350 (e.g., substantially not encapsulated). In this manner, the anode leads 1323 and the cathode leads 1333 can be electronically connected to an anode terminal (not shown) and a cathode terminal (not shown) to form, for example, a battery.

While the anodes 1310 and the cathodes 1330 are shown in FIG. 13 as being individually constructed electrodes, in other embodiments, an anode and a cathode can be coupled to a plate or foil (e.g., a bipolar configuration also referred to for simplicity as "electrode pair"). In such embodiments, a plurality of electrode pairs can be arranged in a stacked configuration with a separator disposed between each adjacent electrode pair.

While various embodiments have been described above, it should be understood that they have been presented by way of example only, and not limitation. For example, while the embodiments herein describe electrochemical devices such as, for example, lithium ion batteries, the systems, methods and principles described herein are applicable to all devices containing electrochemically active media. Said another way, any electrodes and/or devices including at least an active material (source or sink of charge carriers), an electrically conducting additive, and an ionically conducting media (electrolyte) such as, for example, batteries, capacitors, electric double-layer capacitors (e.g., ultracapacitors), pseudo-capacitors, etc., are within the scope of this disclosure. Furthermore, the embodiments can be used with non-aqueous and/or aqueous electrolyte battery chemistries.

Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. Additionally, certain steps may be partially completed and/or omitted before proceeding to subsequent steps.

While various embodiments have been particularly shown and described, various changes in form and details may be made. For example, although various embodiments have been described as having particular features and/or combinations of components, other embodiments are possible having any combination or sub-combination of any features and/or components from any of the embodiments described herein. The specific configurations of the various components can also be varied.

The invention claimed is:
1. An electrochemical cell, comprising:
an anode cavity at least partially defined by a separator;
a first porous current collector disposed in the anode cavity and configured to substantially fill the anode cavity;
an anode semi-solid mixture disposed in the anode cavity at least partially embedded in the first porous current collector thereby forming a finished anode;
a cathode cavity at least partially defined by the separator;
a second porous current collector disposed in the cathode cavity and configured to substantially fill the cathode cavity; and a cathode semi-solid mixture disposed in the cathode cavity at least partially embedded in the second porous current collector thereby forming a finished cathode, wherein at least one of the first porous current collector and second porous current collector has a thickness in the range of 200 microns to about 5,000 microns; and wherein the thickness of the finished anode is greater than the thickness of the first porous current collector and/or the thickness of the finished cathode is greater than the thickness of the second porous current collector.

2. The electrochemical cell of claim 1, wherein at least a portion of the first porous current collector disposed in the anode cavity extends beyond the separator and outside the anode cavity to form an anode lead.

3. The electrochemical cell of claim 1, wherein at least a portion of the second porous current collector disposed in the cathode cavity extends beyond the separator and outside the cathode cavity to form a cathode lead.

4. The electrochemical cell of claim 1, wherein at least one of the first porous current collector and second porous current collector has a thickness in the range of 200 microns to about 2,500 microns.

5. The electrochemical cell of claim 1, wherein at least one of the first porous current collector and second porous current collector is rigid and substantially planar when unsupported.

6. The electrochemical cell of claim 1, wherein the anode semi-solid mixture substantially encapsulates the first porous current collector disposed in the anode cavity, and/or the cathode semi-solid mixture substantially encapsulates the second porous current collector disposed in the cathode cavity.

7. The electrochemical cell of claim 1, wherein the first porous current collector disposed in the anode cavity and/or the second porous current collector disposed in the cathode cavity has a porosity of at least 66%.

8. An electrochemical cell, comprising:
a cathode;
an anode cavity at least partially defined by a separator;
a porous current collector disposed in the anode cavity and configured to substantially fill the anode cavity, the porous current collector having a thickness in the range of 200 microns to about 5,000 microns; and
an anode semi-solid mixture disposed in the anode cavity at least partially embedded in the porous current collector thereby forming a finished anode, the finished anode having a thickness greater than the thickness of the porous current collector,
the separator disposed between the cathode and the anode semi-solid mixture.

9. The electrochemical cell of claim 8, wherein at least a portion of the porous current collector disposed in the anode cavity extends beyond the separator and outside the anode cavity to form an anode lead.

10. The electrochemical cell of claim 8, wherein the porous current collector has a thickness in the range of 200 microns to about 2,500 microns.

11. The electrochemical cell of claim 8, wherein the porous current collector is rigid and substantially planar when unsupported.

12. The electrochemical cell of claim 8, wherein the anode semi-solid mixture substantially encapsulates the porous current collector disposed in the anode cavity.

13. The electrochemical cell of claim 8, wherein the porous current collector disposed in the anode cavity has a porosity of at least 66%.

14. An electrochemical cell, comprising:
an anode;
a cathode cavity at least partially defined by a separator;
a porous current collector disposed in the cathode cavity and configured to substantially fill the cathode cavity, the porous current collector having a thickness in the range of 200 microns to about 5,000 microns; and
a cathode semi-solid mixture disposed in the cathode cavity at least partially embedded in the porous current collector thereby forming a finished cathode, the finished cathode having a thickness greater than the thickness of the porous current collector,
the separator disposed between the anode and the cathode semi-solid mixture.

15. The electrochemical cell of claim 14, wherein at least a portion of the porous current collector disposed in the cathode cavity extends beyond the separator and outside the cathode cavity to form a cathode lead.

16. The electrochemical cell of claim 14, wherein the porous current collector has a thickness in the range of 200 microns to about 2,500 microns.

17. The electrochemical cell of claim 14, wherein the porous current collector is rigid and substantially planar when unsupported.

18. The electrochemical cell of claim 14, wherein the cathode semi-solid mixture includes an active material and a conductive material in a non-aqueous liquid electrolyte.

19. The electrochemical cell of claim 14, wherein the cathode semi-solid mixture substantially encapsulates the porous current collector disposed in the cathode cavity.

20. The electrochemical cell of claim 14, wherein the porous current collector disposed in the cathode cavity has a porosity of at least 66%.

21. The electrochemical cell of claim 1, wherein at least one of the first porous current collector and second porous current collector has a thickness in the range of 200 microns to about 500 microns.

22. The electrochemical cell of claim 8, wherein the porous current collector has a thickness in the range of 200 microns to about 500 microns.

23. The electrochemical cell of claim 14, wherein the porous current collector has a thickness in the range of 200 microns to about 500 microns.

* * * * *